US011899877B2

(12) United States Patent
Fujisawa

(10) Patent No.: US 11,899,877 B2
(45) Date of Patent: Feb. 13, 2024

(54) DISPLAY DEVICE AND WATCH

(71) Applicant: Japan Display Inc., Tokyo (JP)

(72) Inventor: Akihiko Fujisawa, Tokyo (JP)

(73) Assignee: Japan Display Inc., Tokyo (JP)

(*) Notice: Subject to any disclaimer, the term of this patent is extended or adjusted under 35 U.S.C. 154(b) by 0 days.

(21) Appl. No.: 17/714,250

(22) Filed: Apr. 6, 2022

(65) Prior Publication Data

US 2022/0229531 A1 Jul. 21, 2022

Related U.S. Application Data

(63) Continuation of application No. PCT/JP2020/036916, filed on Sep. 29, 2020.

(30) Foreign Application Priority Data

Oct. 7, 2019 (JP) .................................. 2019-184496

(51) Int. Cl.
*G06F 3/041* (2006.01)
*G04G 21/08* (2010.01)
(Continued)

(52) U.S. Cl.
CPC .......... *G06F 3/04166* (2019.05); *G04G 21/08* (2013.01); *G06F 3/044* (2013.01); *G06F 3/0412* (2013.01); *G09G 3/3674* (2013.01)

(58) Field of Classification Search
CPC .... G06F 3/04166; G06F 3/0412; G06F 3/044; G06F 3/04184; G06F 3/0443; G06F 3/02;
(Continued)

(56) References Cited

U.S. PATENT DOCUMENTS

2008/0024455 A1* 1/2008 Lee .................. G06F 3/044
345/173
2010/0182273 A1* 7/2010 Noguchi ............... G06F 3/0446
345/173

(Continued)

FOREIGN PATENT DOCUMENTS

JP 2009-244958 A 10/2009
JP 2014-199493 A 10/2014
(Continued)

OTHER PUBLICATIONS

International Search Report issued in International Patent Application No. PCT/JP2020/036916 dated Dec. 1, 2020 and English translation of same. 5 pages.

(Continued)

*Primary Examiner* — Hong Zhou
(74) *Attorney, Agent, or Firm* — K&L Gates LLP

(57) ABSTRACT

According to one embodiment, a display device includes a display part, a plurality of sensor electrodes and a controller. The display part is configured to display an image. The plurality of sensor electrodes are arranged to surround the display part. The controller is electrically connected to the sensor electrodes, and is configured to detect an object close to or contacting the sensor electrodes. The controller drives at least one of the sensor electrodes as a detection electrode and drives at least one of the sensor electrodes as a drive electrode.

19 Claims, 18 Drawing Sheets

(51) Int. Cl.
*G06F 3/044* (2006.01)
*G09G 3/36* (2006.01)

(58) Field of Classification Search
CPC ......... G09G 3/3674; G09G 2300/0426; G09G 2310/0297; G09G 3/3677; G09G 2310/0224; G09G 2354/00; G09G 3/3648; H01H 36/00; G04G 21/08; G04G 7/005; G04G 17/045
See application file for complete search history.

(56) References Cited

U.S. PATENT DOCUMENTS

| | | | | |
|---|---|---|---|---|
| 2010/0265172 | A1* | 10/2010 | Sadahiro | G06F 3/03547 345/157 |
| 2011/0193818 | A1* | 8/2011 | Chen | G06F 3/041 345/173 |
| 2014/0292678 | A1 | 10/2014 | Hayashi et al. | |
| 2014/0292686 | A1* | 10/2014 | Yamamoto | G06F 3/0412 345/173 |
| 2014/0333546 | A1* | 11/2014 | Chang | G06F 3/04166 345/173 |
| 2015/0062075 | A1* | 3/2015 | Wakuda | G06F 3/04164 345/174 |
| 2015/0185933 | A1* | 7/2015 | Zhang | G06F 3/04166 345/174 |
| 2015/0212616 | A1* | 7/2015 | Wang | G06F 3/0446 345/174 |
| 2015/0293643 | A1* | 10/2015 | Shepelev | G06F 3/0412 345/174 |
| 2016/0117044 | A1* | 4/2016 | Weng | G06F 3/04166 345/174 |
| 2017/0038877 | A1* | 2/2017 | Kuboyama | G06F 1/163 |
| 2017/0075491 | A1* | 3/2017 | Ye | G06F 3/0443 |
| 2017/0090239 | A1* | 3/2017 | Jung | G02F 1/133345 |
| 2019/0095008 | A1* | 3/2019 | Murata | G06F 3/0444 |

FOREIGN PATENT DOCUMENTS

| | | |
|---|---|---|
| JP | 2015-215735 A | 12/2015 |
| JP | 2015-219664 A | 12/2015 |
| JP | 2019-061563 A | 4/2019 |

OTHER PUBLICATIONS

Written Opinion issued in International Patent Application No. PCT/JP2020/036916 dated Dec. 1, 2020. 4 pages.
English Translation of Office Action issued in related Japanese Patent Application No. 2019-184496 dated May 9, 2023. 4 pages.

* cited by examiner

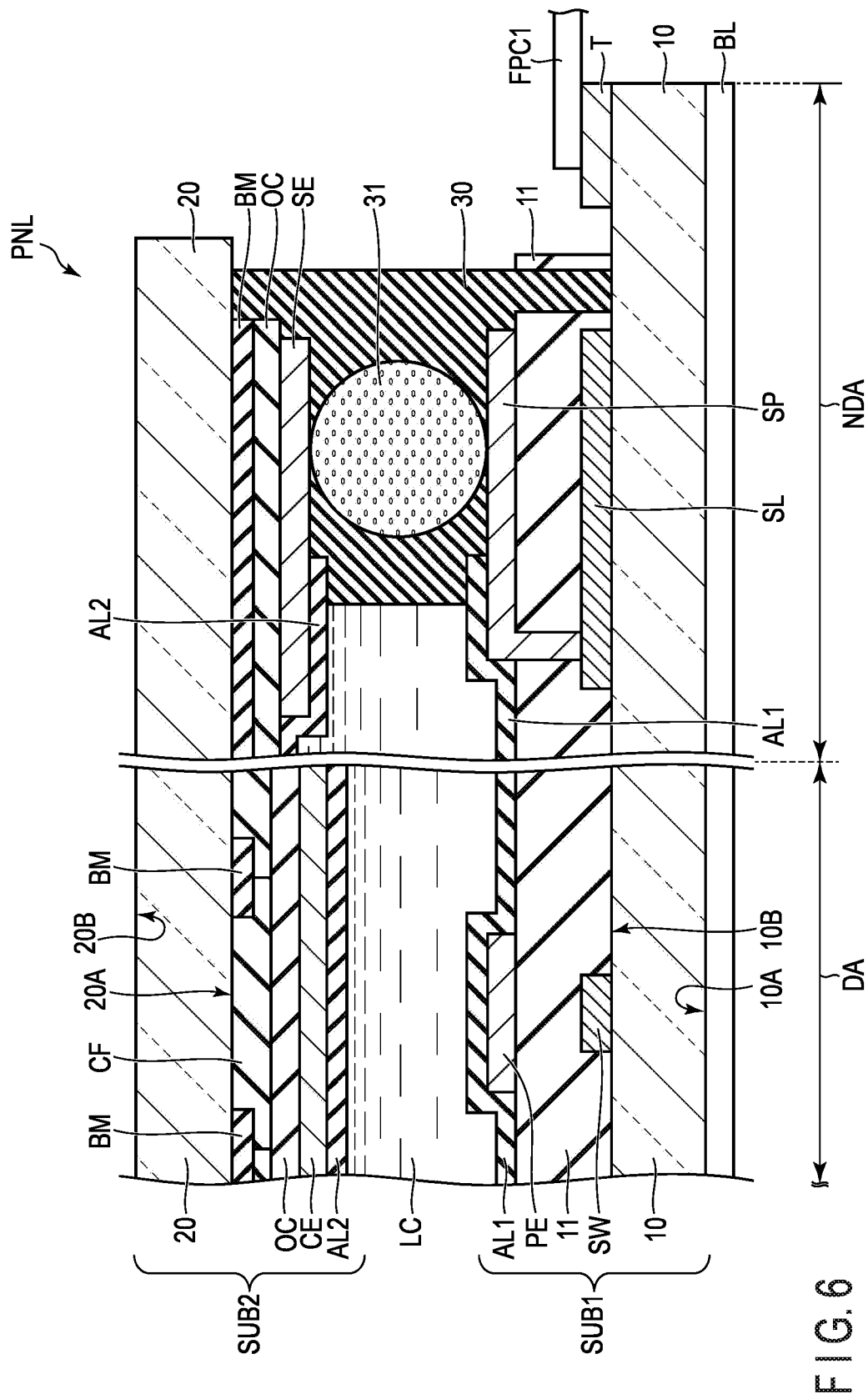
F I G. 6

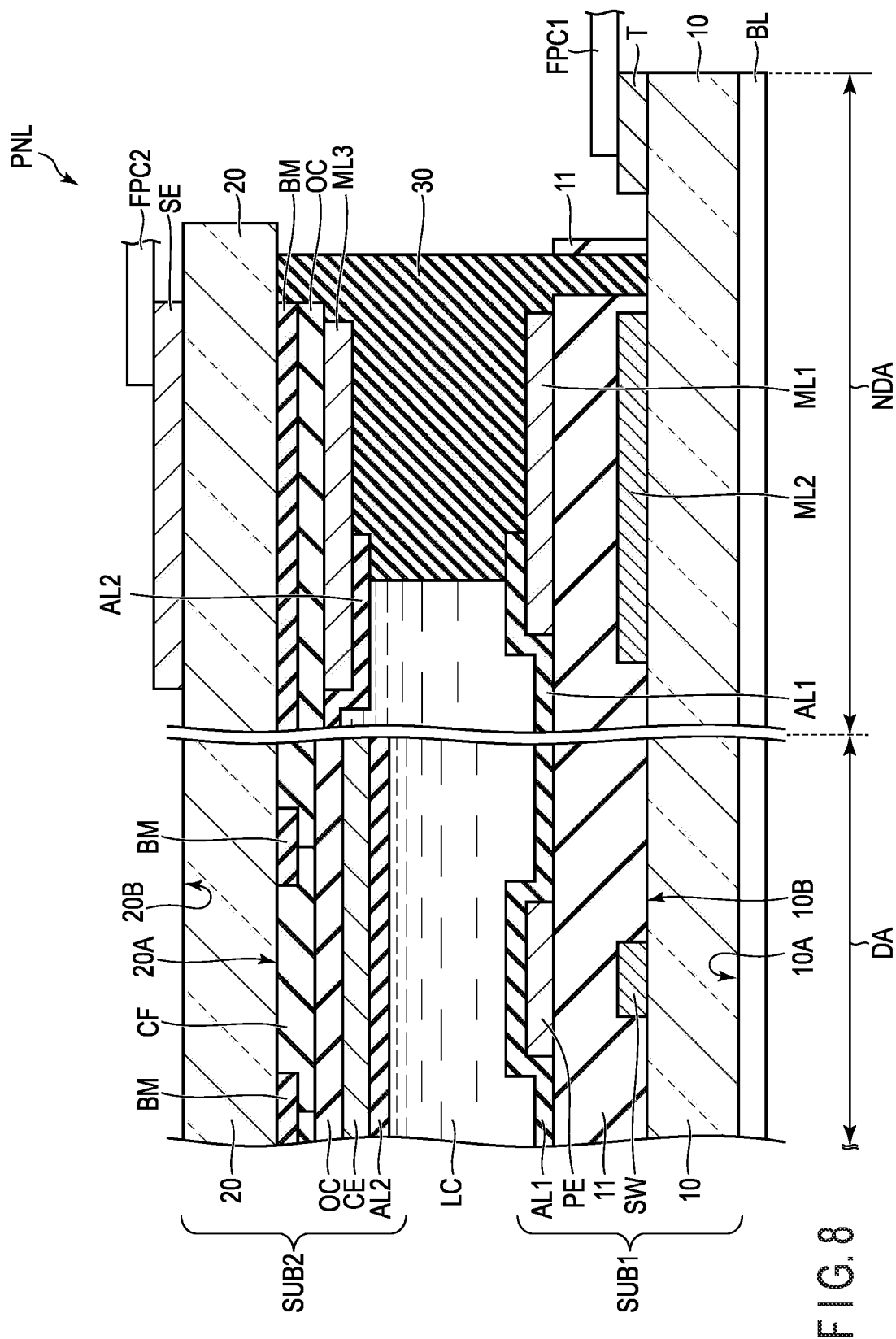
F I G. 8

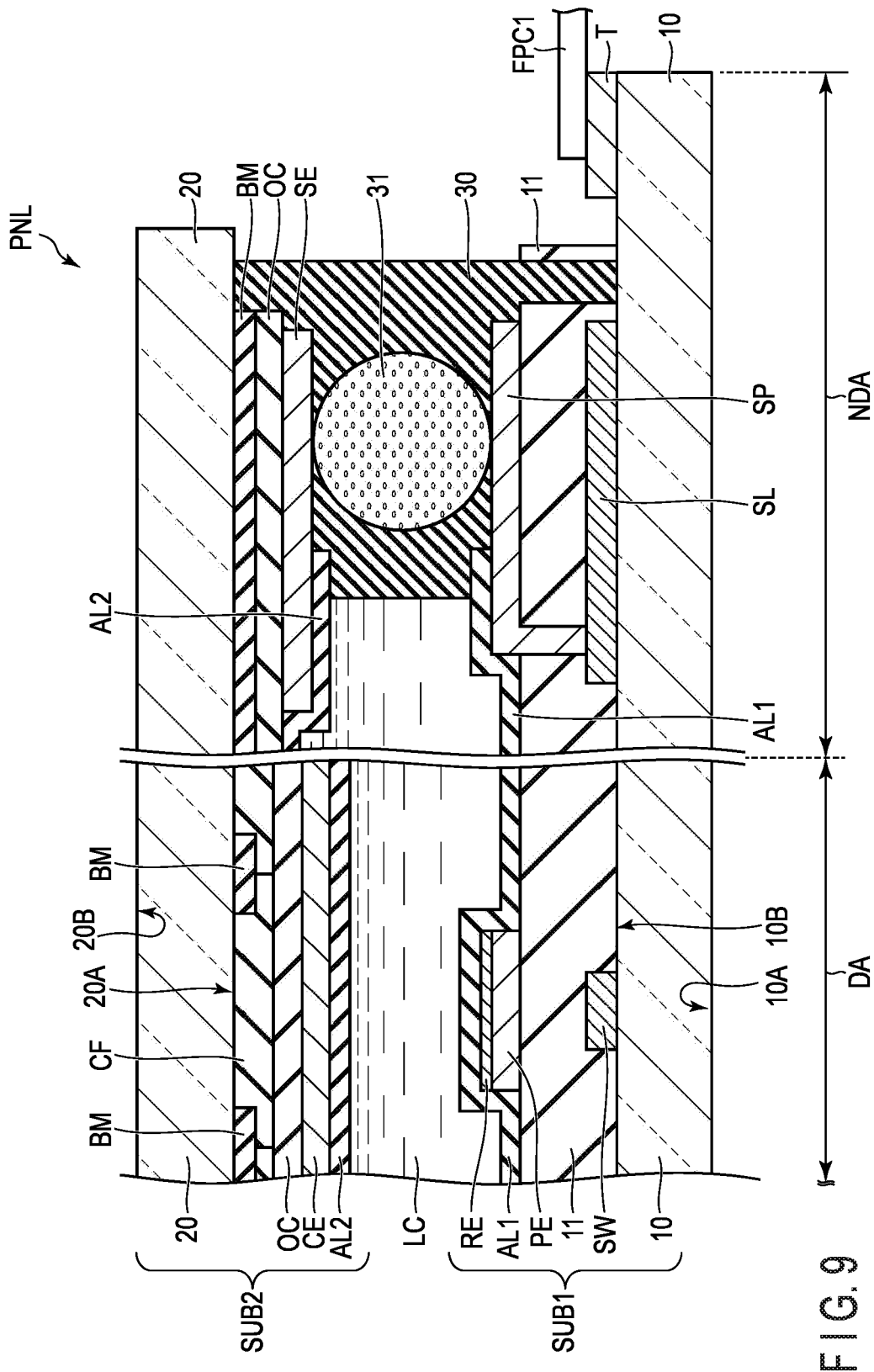
F I G. 9

F.I.G. 10

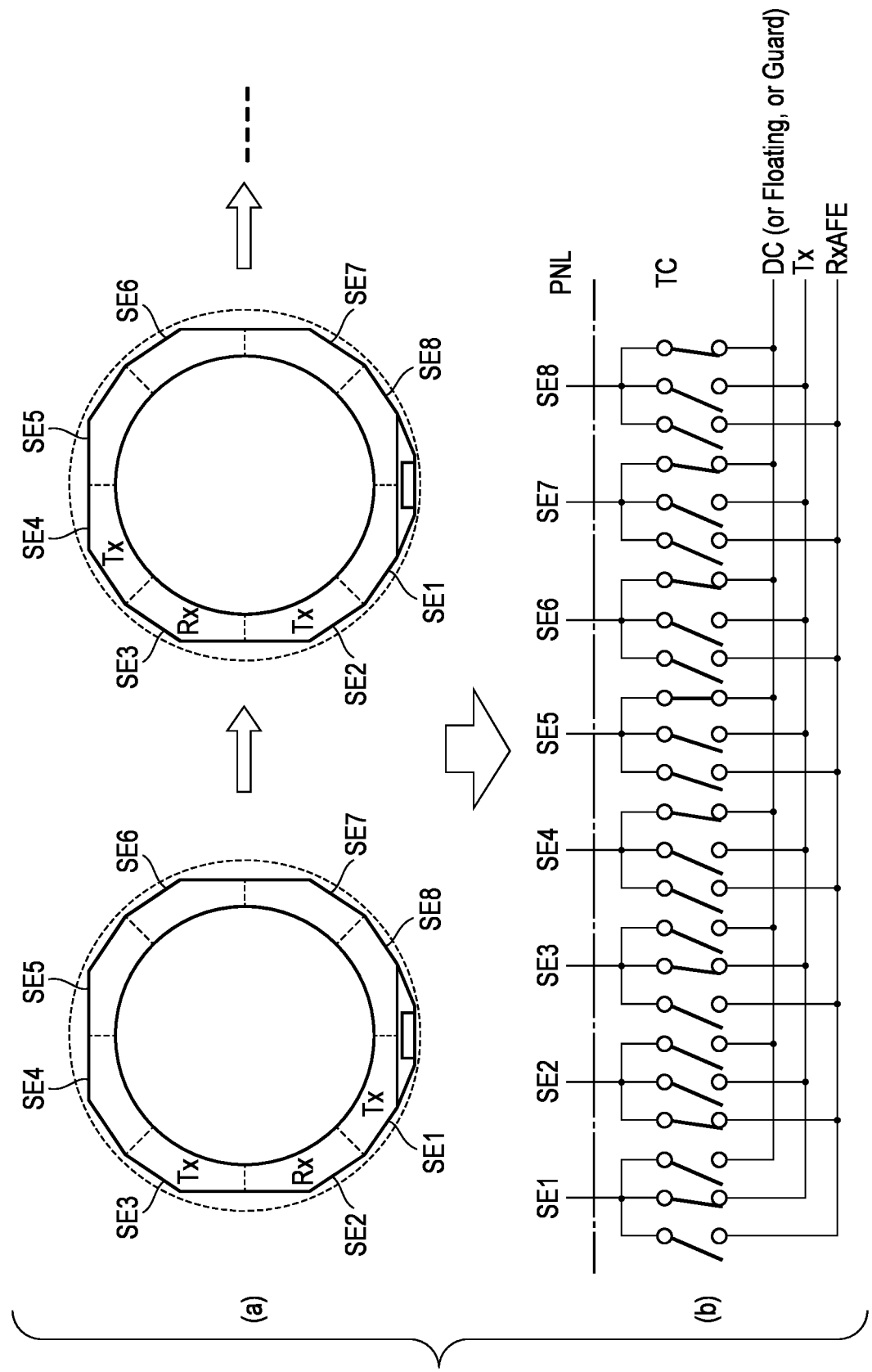
F I G. 12

DISPLAY DEVICE AND WATCH

CROSS-REFERENCE TO RELATED APPLICATIONS

This application is a Continuation Application of PCT Application No. PCT/JP2020/036916, filed Sep. 29, 2020, and based upon and claiming the benefit of priority from Japanese Patent Application No. 2019-184496, filed Oct. 7, 2019, the entire contents of all of which are incorporated herein by reference.

FIELD

Embodiments described herein relate generally to a display device and a watch.

BACKGROUND

In recent years, wearable devices with a touch detection function (for example, wristwatch wearable device, eyeglasses wearable devices, etc.) have been widely used. In such wearable devices, both display quality in image displaying and good operability by touching are required, and thus, various developments have been made.

BRIEF DESCRIPTION OF THE DRAWINGS

FIG. 6 is a schematic cross-sectional view of a structural example of a display panel, taken along line I-I of FIG. 1.

FIG. 8 is a schematic cross-sectional view of another structural example, which is different from the structural example of FIG. 6.

FIG. 9 is a schematic cross-sectional view of another structural example, which is different from the structural example of FIG. 6.

FIG. 12 is a diagram illustrating a second drive method which is one of the drive methods for sensor electrodes.

DETAILED DESCRIPTION

Figure 1:
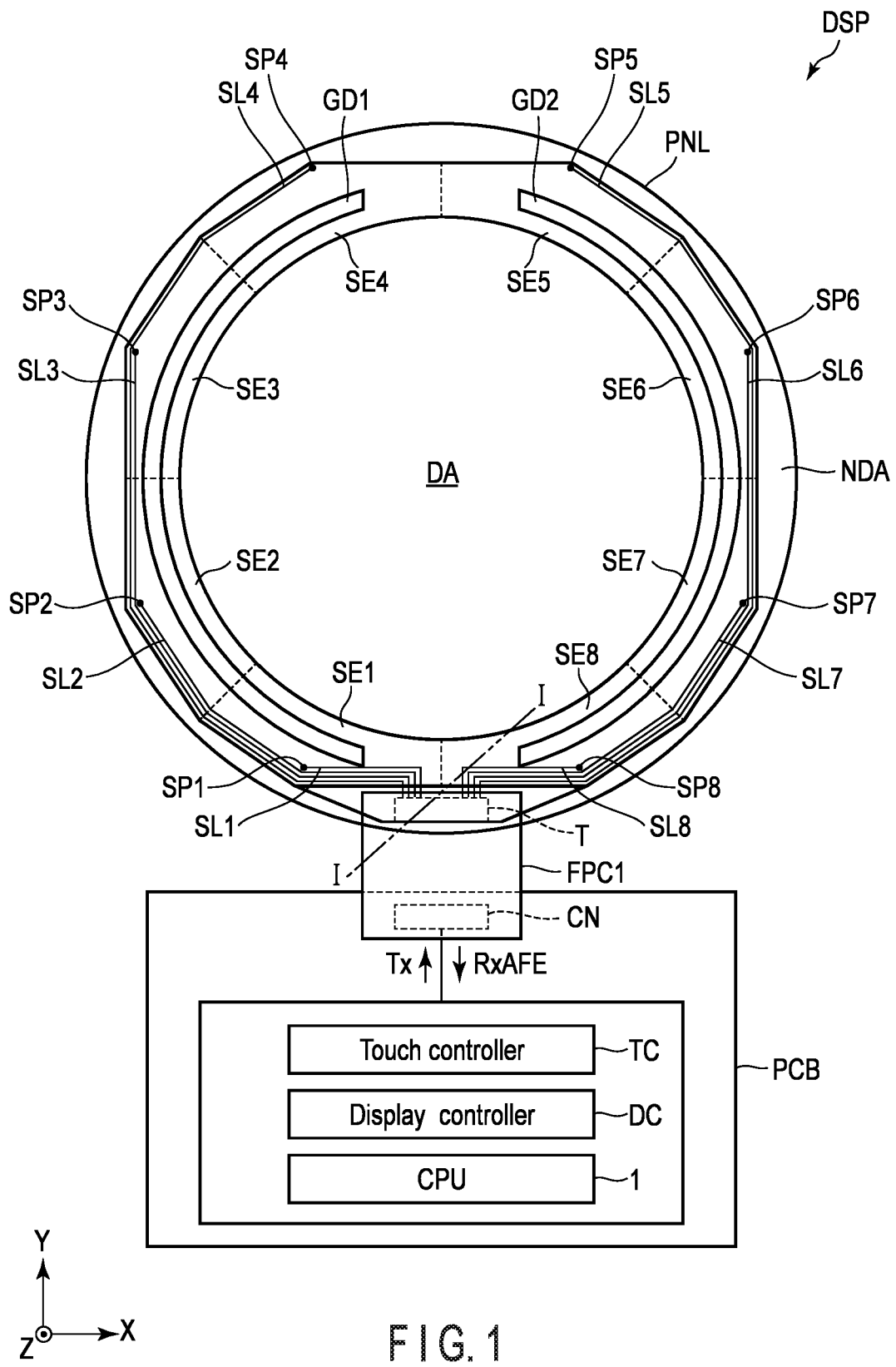
FIG. 1 is a plan view illustrating a structural example of a display device of an embodiment.

In general, according to one embodiment, a display device includes a display part, a plurality of sensor electrodes and a controller. The display part is configured to display an image. The plurality of sensor electrodes are arranged to surround the display part. The controller is electrically connected to the sensor electrodes, and is configured to detect an object close to or contacting the sensor electrodes. The controller drives at least one of the sensor electrodes as a detection electrode and drives at least one of the sensor electrodes as a drive electrode.

According to another embodiment, a display device includes a display part, a plurality of sensor electrodes and a controller. The display part is configured to display an image. The plurality of sensor electrodes are arranged to surround the display part. The controller is electrically connected to the sensor electrodes and is configured to detect an object approaching or contacting the sensor electrodes. The controller selects M sensor electrodes from the sensor electrodes, outputs a drive signal to detect an approaching or contacting object to the selected M sensor electrodes, and receives a detection signal output in response to the input of the drive signal from the selected M sensor electrodes.

Embodiments will be described hereinafter with reference to the accompanying drawings.

The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

In the present embodiment, as an example of a display device, a display device with a touch detection function will be explained. There are various touch detection methods, such as optical, resistive, capacitive, and electromagnetic induction. Among the above methods, capacitive touch detection is based on the change in capacitance caused by an approaching or contacting object (e.g., a finger), and has advantages such as a relatively simple structure and low power consumption. In the present embodiment, a display device with a touch detection function using the capacitance method will be mainly explained.

Note that, the capacitance method will include a mutual-capacitive method, which generates an electric field using a pair of transmitting electrodes (drive electrodes) and receiving electrodes (detection electrodes) arranged in a state of separation from each other, and detects the change in the electric field (decrease in capacitance) accompanying an approaching or contacting object, and a self-capacitive method, which detects the change in capacitance (increase in capacitance) accompanying an approaching or contacting object using a single electrode.

FIG. 1 is a plan view illustrating a structural example of a display device DSP of an embodiment. In FIG. 1, the structure mainly related to the touch detection function is illustrated. In one example, a first direction X, second direction Y, and third direction Z are orthogonal to each other, but they may intersect at angles other than 90 degrees. The first direction X and the second direction Y correspond to the directions parallel to the main surface of the substrate of the display device DSP, and the third direction Z corresponds to the thickness direction of the display device DSP. In the present application, the direction toward the tip of the arrow indicating the third direction Z may be referred to as the upward direction, and the direction from the tip of the arrow to the opposite direction may be referred to as the downward direction. Assuming that there is an observation position for observing the display device DSP at the tip of the arrow indicating the third direction Z, and from this observation position, looking toward the X-Y plane defined by the first direction X and the second direction Y will be referred to as plan view.

As shown in FIG. 1, the display device DSP includes a display panel PNL, flexible printed circuit board FPC1, and printed circuit board PCB. The display panel PNL and the printed circuit board PCB are electrically connected via the flexible printed circuit board FPC1. Specifically, the terminal part T of the display panel PNL and the connection part CN of the printed circuit board PCB are electrically connected via the flexible printed circuit board FPC1.

The display panel PNL includes a display part DA that displays images and a frame-like non-display part NDA that surrounds the display part DA. Of a plurality of concentric circles of FIG. 1, the area represented by the innermost circle corresponds to the display part DA, and the area between the outermost circle and the innermost circle corresponds to the non-display part NDA. Note that, FIG. 1 illustrates a case where the display part DA is circular in shape and the non-display part NDA surrounding the display part DA is also of the same shape, but no limitation is intended thereby, and the display part DA may not be circular and the non-display part NDA may not be circular. For example, the display part DA may be a rectangular shape, and the non-display part NDA may be a different shape from the display part DA. For example, the display part DA may be a rectangular shape. Furthermore, if the display part DA is rectangular, the non-display part NDA may be circular, which is a different shape from the display part DA.

In the non-display part NDA, a plurality of sensor electrodes SE1 to SE8 are arranged to surround the display part DA. FIG. 1 illustrates eight sensor electrodes SE1 to SE8; however, the number of sensor electrodes placed in the non-display part NDA is not limited thereto, and any number of sensor electrodes may be arranged to surround the non-display part NDA. Although described later, the sensor electrodes SE1 to SE8 are electrically connected to sensor pads SP1 to SP8 via conductive materials (conductive beads) 31 included in sealing 30. Furthermore, sensor wiring lines SL1 to SL8 extending from the sensor pads SP1 to SP8 are electrically connected to the terminal part T located in the non-display part NDA. In FIG. 1, a case where the sensor wiring lines SL1 to SL8 extend along the periphery of the sensor electrode SE1 to SE8 is shown; however, the sensor wiring lines SL1 to SL8 may extend in any other shape. The sensor wiring lines SL1 to SL8 are all to input drive signals (Tx signals) to the sensor electrodes SE1 to SE8, and to output detection signals (RxAFE signals) from sensor electrodes SE1 to SE8.

Scan line drive circuits GD1 and GD2 are arranged in the right and left sides of the non-display part NDA. The scan line drive circuits GD1 and GD2 and sensor electrodes SE1 to SE8 overlap with each other in the plan view. Since the scan line drive circuits GD1 and GD2 will be described later, the detailed explanation is omitted here.

On the printed circuit board PCB, a touch controller TC, display controller DC, CPU1, and the like are arranged. The touch controller TC outputs drive signals (Tx signals) to the sensor electrodes SE1 to SE8 arranged in the display panel PNL, and receives input of detection signals (RxAFE signals) output from the sensor electrodes SE1 to SE8 (that is, detects an approaching or contacting object). The display controller DC outputs video signals representing images on the display part DA of the display panel PNL and control signals for controlling scan line drive circuits GD1 and GD2. The CPU 1 outputs synchronization signals that define the operation timing of the touch controller TC and the display controller DC, and executes operations in response to touches indicated by detection signals received for input by the touch controller TC.

Figure 2:
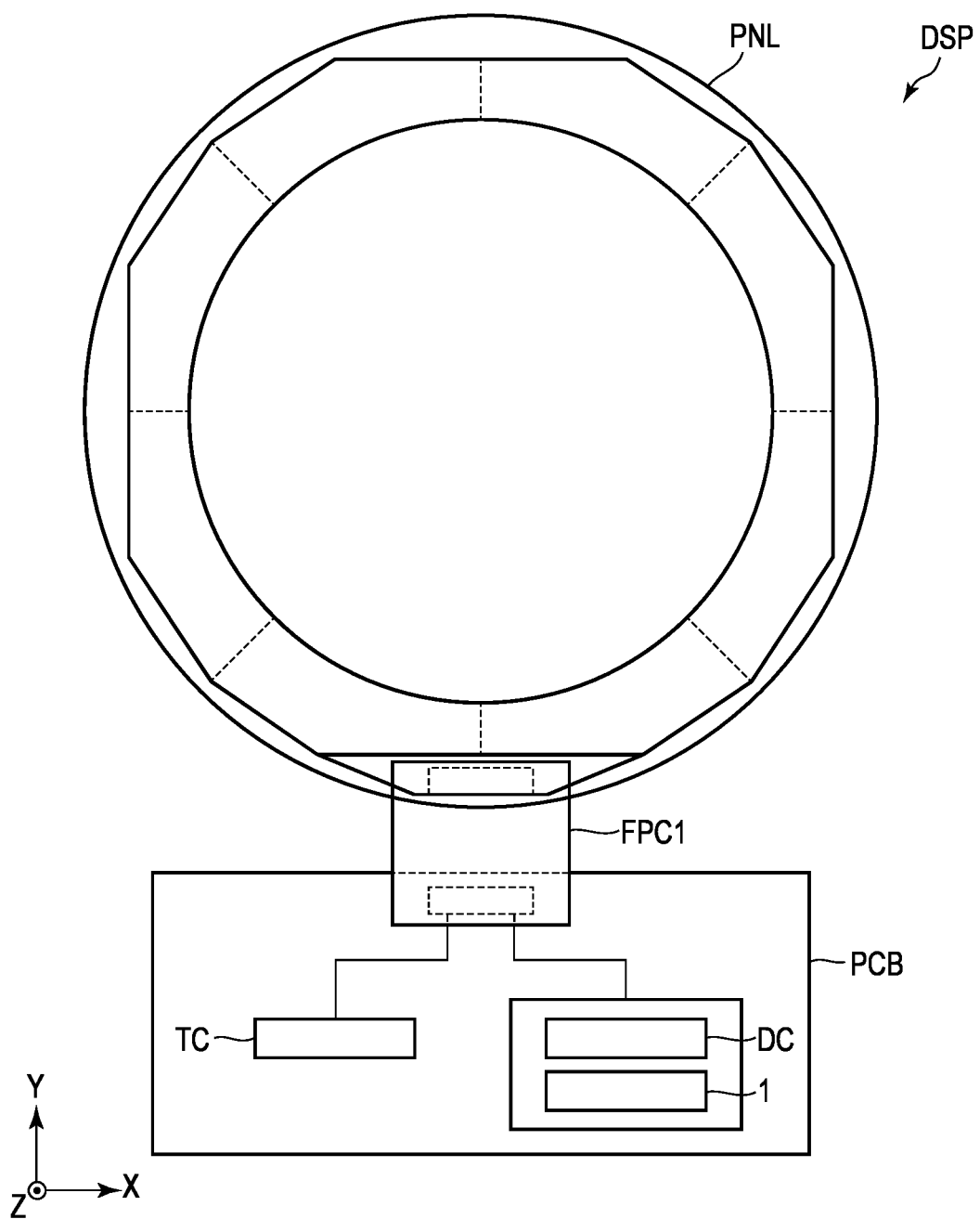
FIG. 2 is a diagram illustrating an example of implementation of a touch controller, display controller, and CPU.
Figure 3:
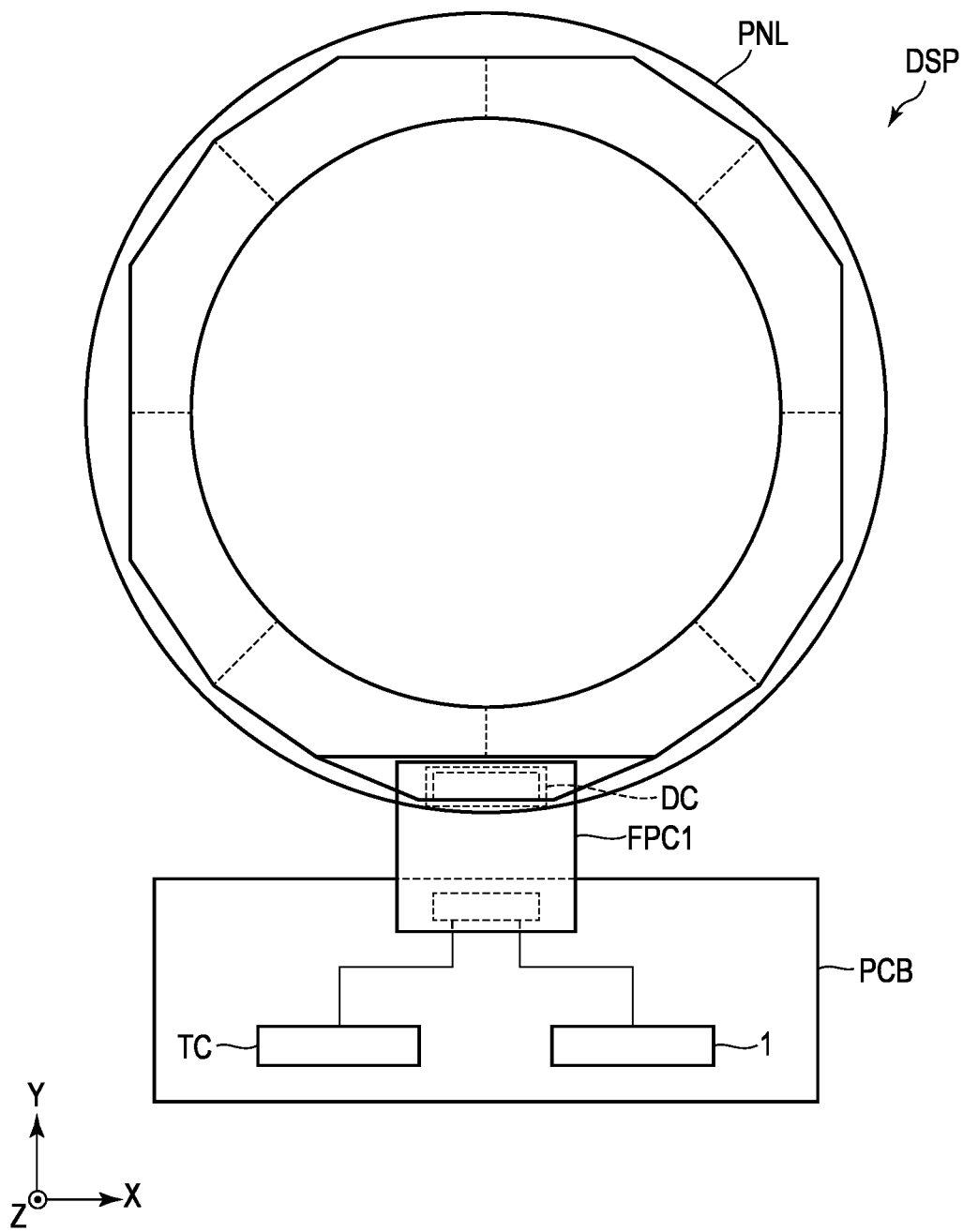
FIG. 3 is a diagram illustrating another example of the implementation of the touch controller, display controller, and CPU.
Figure 4:
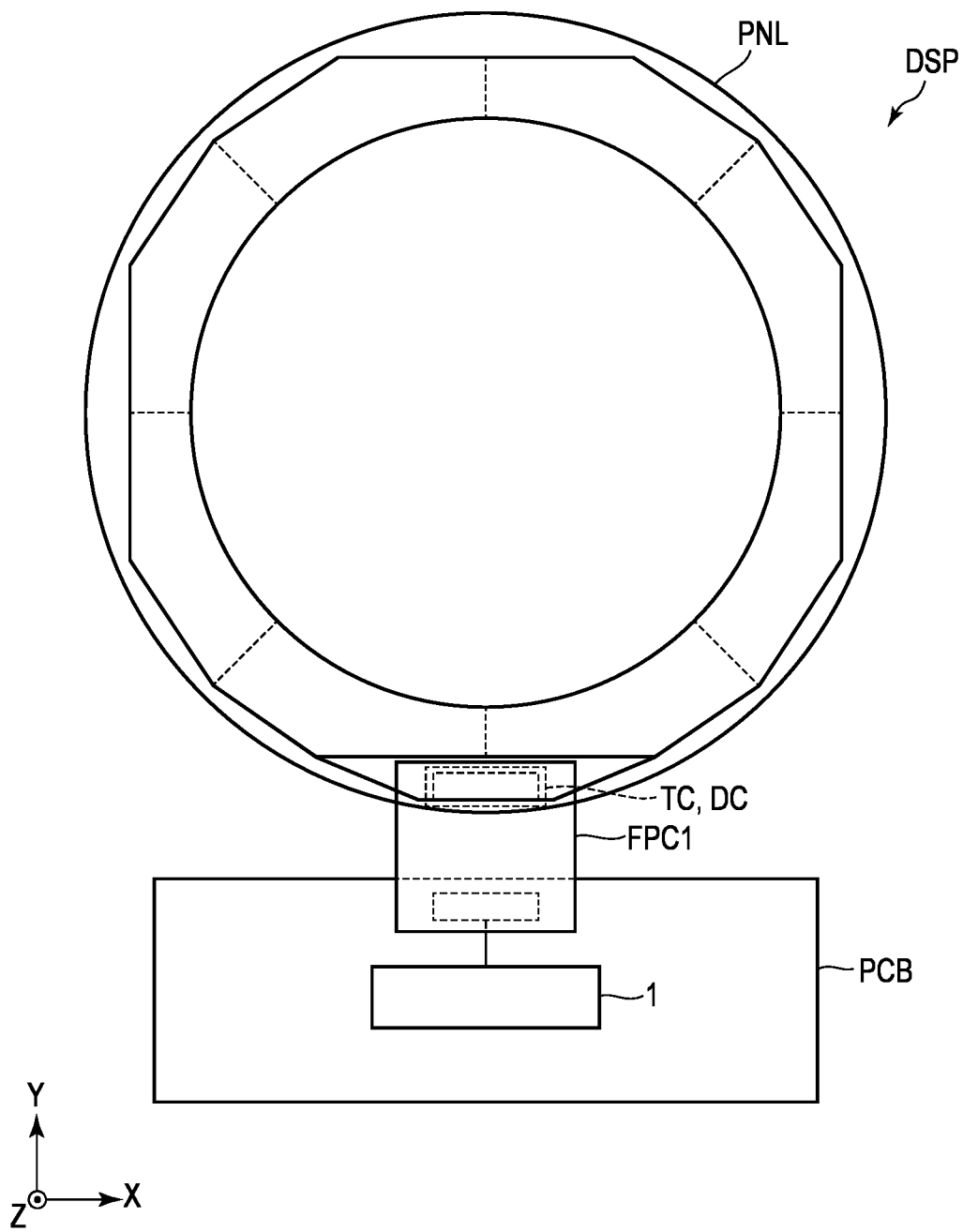
FIG. 4 is a diagram illustrating yet another example of the implementation of the touch controller, display controller, and CPU.

FIG. 1 illustrates a case where the touch controller TC, the display controller DC, and the CPU1 are realized by a single semiconductor chip; however, the implementation is not limited thereto, and as in FIG. 2, only the touch controller TC may be separated and each part may be mounted on the printed circuit board PCB, or as in FIG. 3, the touch controller TC and the CPU 1 may be mounted separately on the printed circuit board PCB, and the display controller DC may be mounted on the display panel PNL using Chip On Glass (COG), or as in FIG. 4, only the CPU 1 may be mounted on the printed circuit board PCB, and the touch controller TC and the display controller DC may be mounted on the display panel PNL by COG.

Figure 5:
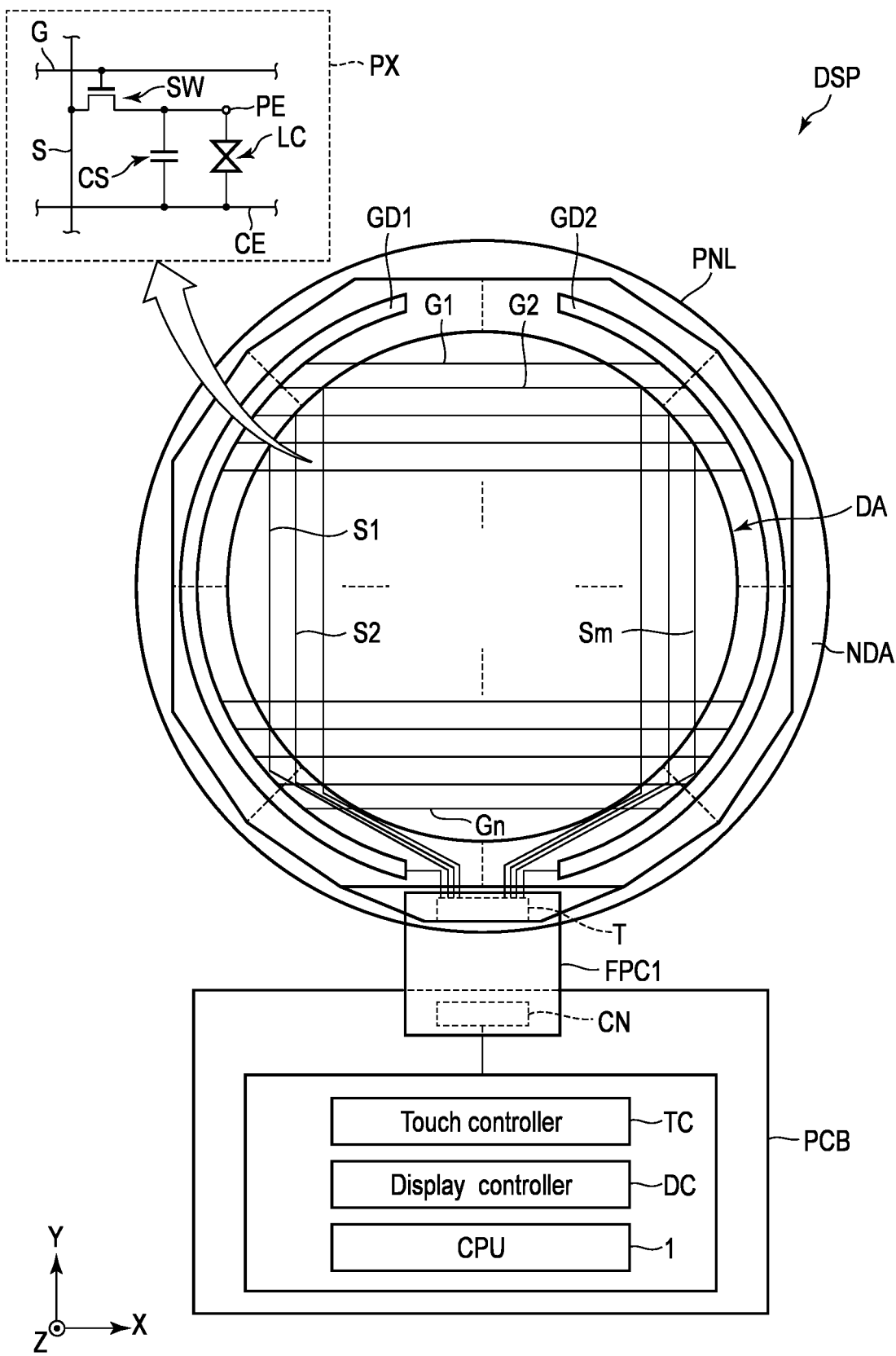
FIG. 5 is another plan view illustrating a structural example of the display device of the embodiment.

FIG. 5 is another plan view of a structural example of the display device DSP. In FIG. 5, the structure mainly related to the image display function is illustrated. As in FIG. 5, the display panel PNL includes n scan lines G (G1 to Gn) in the display part DA and m signal lines S (S1 to Sm) in the display part DA. Note that, both n and m are positive integers, and n may be equal to m, or n may be different from m. The scan lines G extend in the first direction X, and are arranged along the second direction Y at intervals. The signal lines S extend in the second direction Y, and are arranged along the first direction X at intervals. In the area defined by scan lines G and signal lines S, pixels PX are arranged. That is, the display panel PNL includes a large number of pixels PX arranged in a matrix in the first direction X and the second direction Y in the display part DA.

As shown in FIG. 5 in an enlarged manner, each pixel PX includes a switching element SW, pixel electrode PE, common electrode CE, liquid crystal layer LC, and the like. The switching element SW includes a thin-film transistor (TFT), for example, and is electrically connected to the scan line G and the signal line S. The scan line G is electrically connected to the switching element SW in each of the pixels PX aligned in the first direction X. The signal line S is electrically connected to the switching element SW of each of the pixels PX aligned in the second direction Y. The pixel electrode PE is electrically connected to the switching element SW. Each of the pixel electrodes PE is opposed to the common electrode CE, and the electric field generated between the pixel electrode PE and the common electrode CE drives the liquid crystal layer LC. The capacitance CS is formed, for example, between the electrodes of the same potential as the common electrode CE and the electrodes of the same potential as the pixel electrode PE.

At least one end of the scan line G is electrically connected to at least one of the scan line drive circuits GD1 and GD2. The scan line drive circuits GD1 and GD2 are electrically connected to the terminal part T, and control signals from display controller DC are input thereto. The scan line drive circuits GD1 and GD2 write video signals to each pixel PX according to the input control signals. One end of the signal line S is electrically connected to the terminal part T, and the video signals from the display controller DC are input to the signal line S.

FIG. 6 is a cross-sectional view of an example of a display panel PNL, taken along line I-I of FIG. 1. FIG. 6 illustrates a case where the sensor electrode SE is placed in the second substrate SUB2 side. Note that, in the following, the structure of the display part DA side and the structure of the non-display part NDA side will be explained.

The display panel PNL includes a first substrate SUB1, second substrate SUB2, liquid crystal layer LC, sealing 30, and backlight unit BL. The first substrate SUB1 and second substrate SUB2 are formed as flat plates parallel to the X-Y plane. The first substrate SUB1 and the second substrate SUB2 overlap with each other in a plan view, and adhered together by the sealing 30. The liquid crystal layer LC is held between the first substrate SUB1 and the second substrate SUB2, and sealed by the sealing 30. The backlight unit BL is placed behind the first substrate SUB1 as an illumination device to illuminate the display panel PNL. Various types of backlight units can be used for the backlight unit BL, and for example, a backlight unit using a light emitting diode (LED), or a cold cathode fluorescent lamp (CCFL) as a light source can be used. Although this is not shown in FIG. 6, a cover member is placed on the second substrate SUB2. Furthermore, in the non-display part NDA side, a light-shielding layer is placed between the second substrate SUB2 and the cover member which is not shown.

In the display part DA side, the first substrate SUB1 includes, as in FIG. 6, a transparent substrate 10, switching element SW, planarization film 11, pixel electrode PE, and alignment film AL1. The first substrate SUB1 includes the scan line G, signal line S, and the like, as in FIG. 5, in addition to the elements described above; however, they are omitted in FIG. 6.

The transparent substrate 10 includes a main surface (lower surface) 10A and a main surface (upper surface) 10B in the opposite side of the main surface 10A. The switching element SW is placed in the main surface 10B side. The planarization film 11 includes at least one or more insulating films, and covers the switching element SW. The pixel electrodes PE are arranged in each pixel PX on the planarization film 11. The alignment film AL1 covers the pixel electrodes PE.

In FIG. 6, the switching element SW is illustrated in a simplified manner, but in reality, the switching element SW includes a semiconductor layer and various electrodes. Furthermore, although not shown in FIG. 6, the switching element SW and the pixel electrode PE are electrically connected to each other through an opening formed in the planarization film 11. Furthermore, as described above, the scan line G and signal line S, which are omitted in FIG. 6, are placed between the transparent substrate 10 and the planarization film 11, for example.

In the display part DA side, the second substrate SUB2 includes, as in FIG. 6, a transparent substrate 20, light-shielding film BM, color filter CF, overcoat layer OC, common electrode CE, and alignment film AL2.

The transparent substrate 20 includes a main surface (lower surface) 20A and a main surface (upper surface) 20B inn the opposite side of the main surface 20A. The main surface 20A of the transparent substrate 20 is opposed to the main surface 10B of the transparent substrate 10. The light-shielding film BM divides the pixels PX. The color filter CF is opposed to the pixel electrodes PE, and a part thereof overlaps the light-shielding film BM. The color filter CF includes a red color filter, green color filter, blue color filter, and the like. The overcoat layer OC covers the color filter CF. The common electrode CE is disposed over the pixels PX, and is opposed to the plurality of pixel electrodes PE in the third direction Z. Furthermore, the common electrode CE covers the overcoat layer OC. The alignment film AL2 covers the common electrode CE.

The liquid crystal layer LC is disposed between the main surface 10B and the main surface 20A, and is in contact with the alignment films AL1 and AL2.

The transparent substrates 10 and 20 are insulating substrates such as glass substrates or plastic substrates. The planarization film 11 is formed by a transparent insulating material such as silicon oxide, silicon nitride, silicon oxynitride, or acrylic resin. In one example, the planarization film 11 includes an inorganic insulating film and an organic insulating film. The pixel electrode PE and the common electrode CE are formed of transparent conductive materials such as indium tin oxide (ITO) and indium zinc oxide (IZO). The light-shielding layer BM is formed of an opaque metal material, for example, molybdenum (Mo), aluminum (Al), tungsten (W), titanium (Ti), silver (Ag), etc. Alignment films AL1 and AL2 are horizontal alignment films having alignment restriction force which is substantially parallel to the X-Y plane. The alignment restriction force may be applied by rubbing treatment or photo-alignment treatment.

In the non-display part NDA side, the first substrate SUB1 includes, as in FIG. 6, a transparent substrate 10, sensor wiring line SL, planarization film 11, sensor pad part SP, and alignment film AL1. Note that, the structure already described for the display part DA side will be omitted from the detailed explanation.

The sensor wiring line SL is placed on the transparent substrate 10. The sensor wiring line SL is arranged on the same layer as the switching element SW in the display part DA side. The sensor pad SP is placed on the planarization film 11. The sensor pad SP is placed on the same layer as the pixel electrode PE in the display part DA side, and is formed of the same transparent conductive material as the pixel electrode PE. The sensor wiring line SL and the sensor pad SP are electrically connected through the opening formed in the planarization film 11.

The terminal T is located in the main surface 10B of the transparent substrate 10 that does not face the main surface 20A. The terminal part T is electrically connected to the flexible printed circuit board FPC1. The terminal T is formed by covering a metal material such as Al with ITO or the like to prevent corrosion.

In the non-display part NDA side, the second substrate SUB2 includes, as in FIG. 6, a transparent substrate 20, light-shielding film BM, overcoat layer OC, sensor electrode SE, and alignment film AL2. Note that the structure already described for the display part DA side will be omitted from the detailed explanation.

In the non-display part NDA side, unlike the display part DA side, the light-shielding film BM is arranged over almost the entire surface of the transparent substrate 20. The overcoat layer OC covers the light-shielding film BM. The sensor electrode SE is arranged in an island shape in the overcoat layer OC side, and is opposed to the sensor pad SP in the third direction Z. The sensor electrode SE is placed on the same layer as the common electrode CE on the display part DA side, and is formed of the same transparent conductive material as the common electrode CE.

The first substrate SUB1 and the second substrate SUB2 are adhered by the sealing 30, and in the non-display part NDA, the sensor pad SP of the first substrate SUB1 and the sensor electrode SE of the second In the non-display part NDA are electrically connected by the conductive material (conductive beads) 31 contained in the sealing 30.

FIG. 6 illustrates a case where the liquid crystal mode of the display panel PNL is the so-called vertical field mode, which is classified into two categories according to the direction of the electric field applied to change the orientation of the liquid crystal molecules contained in the liquid crystal layer LC. However, the present structure is also applicable to the case where the liquid crystal mode is the so-called horizontal field mode. However, if the sensor electrode SE is placed on the second substrate SUB2 side, it is possible to form the sensor electrode SE using the same transparent conductive material as the common electrode CE placed on the display part DA side in the vertical field mode, whereas in the case of horizontal field mode, the sensor electrode SE must be formed separately on the second substrate SUB2. Therefore, if the sensor electrode SE is to be placed in the second substrate SUB2 side, it is preferable that the liquid crystal mode is the vertical field mode rather than the horizontal field mode.

The vertical field mode described above includes, for example, the Twisted Nematic (TN) mode and Vertical Alignment (VA) mode. The horizontal field mode described above includes, for example, In-Plane Switching (IPS) mode and Fringe Field Switching (FFS) mode, which is one of the IPS modes.

Figure 7:
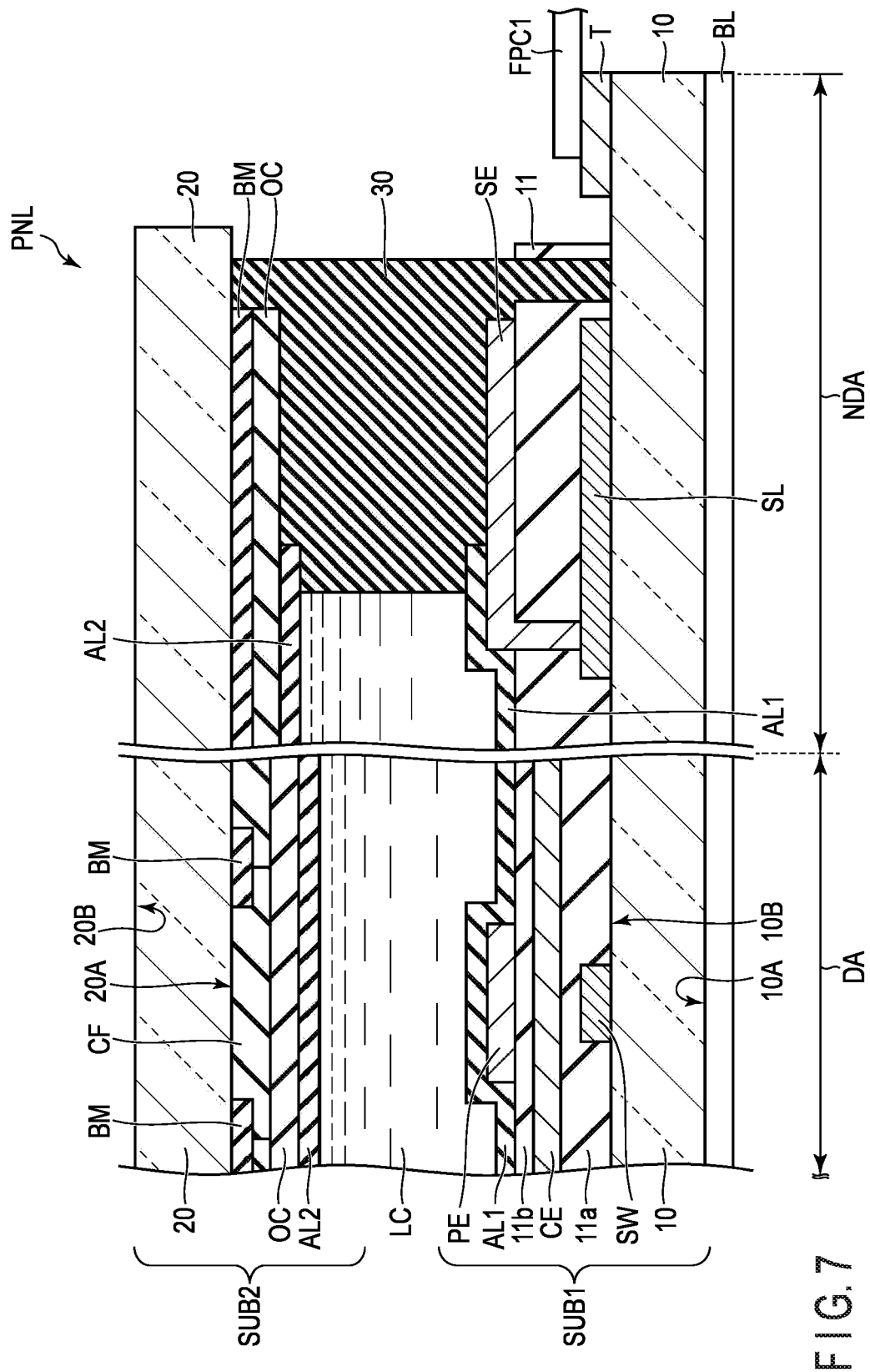
FIG. 7 is a schematic cross-sectional view of another structural example, which is different from the structural example of FIG. 6.

FIG. 7 is a cross-sectional view of a display panel PNL with a different structure from that of FIG. 6. FIG. 7 illustrates a case where the sensor electrode SE is placed on the first substrate SUB1 side. Note that, although this is omitted in FIG. 7 as in FIG. 6 above, a cover member is placed on the second substrate SUB2. Furthermore, in the non-display part NDA side, a light-shielding layer is placed between the second substrate SUB2 and the cover member which is not shown.

As in FIG. 7, the sensor electrode SE may be placed in the first substrate SUB1 side instead of the second substrate SUB2 side. FIG. 7 shows an example where the sensor electrode SE is placed in the first substrate SUB1 side, in which the sensor electrode SE is placed on the same layer as the pixel electrode PE and is formed of the same transparent conductive material as pixel electrode PE.

If the sensor electrode SE is placed in the first substrate SUB1 side, the first substrate SUB1 does not need to conduct with the second substrate SUB2 in the non-display part NDA, the sealing 30 does not need to contain conductive beads 31 as in FIG. 7. That is, the first substrate SUB1 and second substrate SUB2 may be adhered by sealing that does not contain conductive beads 31.

Note that, FIG. 7 illustrates a structure in which the pixel electrode PE and the common electrode CE are placed in the first substrate SUB1 side, that is, when the liquid crystal mode of the display panel PNL is the horizontal field mode; however, the present structure is also applicable to the case where the liquid crystal mode is the vertical field mode. Furthermore, in FIG. 7, the pixel electrode PE is placed above the common electrode CE on the first substrate SUB1 side; however, the positional relationship between the pixel electrode PE and the common electrode CE may be reversed. That is, the common electrode CE may be placed above the pixel electrode PE.

Furthermore, FIG. 7 illustrates an example where the sensor electrode SE is placed on the same layer as the pixel electrode PE in the display part DA side; however, no limitation is intended thereby, and the sensor electrode SE may be placed on the same layer as the common electrode CE in the display part DA side, and formed of the same transparent conductive material as the common electrode CE. The sensor electrode SE may be placed on the same layer as the scan line G and signal line S in the display part DA side, and formed of the same metal material as the aforementioned lines.

FIG. 8 illustrates a cross section of a display panel PNL with a different structure from that of FIG. 6. FIG. 8 illustrates an example where the sensor electrode SE is placed in the second substrate SUB2 side, and on the main surface 20B of the transparent substrate 20. Although this is omitted from FIG. 8 as in FIGS. 6 and 7 above, a cover member is placed on the second substrate SUB2. Furthermore, in the non-display part NDA side, a light-shielding layer is placed between the second substrate SUB2 and the cover member which is not shown.

As in FIG. 8, the sensor electrode SE may be placed on the main surface 20B of the transparent substrate 20 in the second substrate SUB2 side. In that case, the sensor electrode SE is electrically connected to the touch controller TC (printed circuit board PCB) via the flexible substrate FPC2.

When the sensor electrode SE is placed on the main surface 20B of the transparent substrate 20, the first substrate SUB1 does not need to conduct with the second substrate SUB2 in the non-display part NDA, and thus, the sealing 30 does not need to contain conductive beads 31 as in FIG. 8. That is, a sealing 30 that does not contain conductive beads 31 may be used for adhesion of the first substrate SUB1 and second substrate SUB2. Furthermore, when the sensor electrode SE is placed on the main surface 20B of the transparent substrate 20, in the non-display part NDA, the metal layer corresponding to the sensor pad SP in FIG. 6 and the metal layer ML2 corresponding to the sensor wiring line SL of FIG. 6 do not need electric connection therebetween. Thus, as in FIG. 8, an opening may not be formed in the planarization film 11. Furthermore, if the sensor electrode SE is placed on the main surface 20B of the transparent substrate 20, in the non-display part NDA, the metal layer ML3 corresponding to the sensor electrode SE of FIG. 6 may not be formed.

Note that, FIG. 8 illustrates an example where the pixel electrode PE is placed in the first substrate SUB1 side and the common electrode CE is placed in the second substrate SUB2 side. That is, FIG. 8 illustrates an example where the liquid crystal mode of the display panel is the vertical field mode; however, the present structure is applicable to the case where the liquid crystal mode is the horizontal field mode.

FIG. 9 illustrates a structural example where the display panel PNL is a reflective display panel.

Each of the structures in FIGS. 6 to 8 can be realized not only with a transmissive display panel in which the backlight unit BL is placed, but also with a reflective display panel. As an example, FIG. 9 illustrates a case in which the sensor electrode SE is placed in the second substrate SUB2 side; however, the sensor electrode SE may be placed in the first substrate SUB1 side or may be placed on the main surface 20B of the transparent substrate 20 in the second substrate SUB2 side. Furthermore, although this is not shown in FIG. 9 as in FIGS. 6 to 8 above, the cover member is placed on the second substrate SUB 2. Furthermore, in the non-display part NDA side, a light-shielding layer is placed between the second substrateSUB2 and the cover member which is not shown.

In the reflective display panel PNL, the backlight unit is not placed behind the first substrate SUB1, and instead, a reflective electrode RE is placed on top of the pixel electrode PE. For example, Ag is used as the reflective electrode RE. The reflective electrode RE reflects the light incident from the second substrate SUB2 side and directs the light to be incident on the liquid crystal layer LC, thereby illuminating the display panel PNL. Note that, FIG. 9 illustrates a case where the reflective electrode RE is placed above the pixel electrode PE; however, no limitation is intended thereby, and the reflective electrode RE may be placed below the pixel electrode PE.

Next, referring to FIGS. 10 and 11, a first drive method which is one of the methods of driving sensor electrodes SE1 to SE8 provided with the display device DSP will be explained. In the case of the first drive method, the sensor electrodes SE1 to SE8 detect an approaching or contacting object (that is, detect touching) using the mutual capacitive method.

In the first drive method, as shown in the left side of FIG. 10(a), at a certain timing, the odd-numbered sensors SE1, SE3, SE5, and SE7 function as detection electrodes (Rx electrodes) to read detection signals, and the even-numbered sensor electrodes SE2, SE4, SE6, and SE8 function as drive electrodes (Tx electrodes) to receive input of drive signals. Furthermore, in the first drive method, as shown in the right side of FIG. 10(a), in the next timing following the aforementioned certain timing, the odd-numbered sensor electrodes SE1, SE3, SE5, and SE7 function as drive electrodes to receive input of drive signals, and the even-numbered SE2, SE4, SE6, SE8 function as detection electrodes to read detection signals. As above, the first drive method is designed so that the odd-numbered sensor electrodes and the even-numbered sensor electrodes function alternately between detection electrodes and drive electrodes.

FIG. 10(b) illustrates an example of a switch circuit on/off of which is controlled by the touch controller TC to realize the first drive method. Note that, the switch circuit may be included in the touch controller TC or may be provided separately from the touch controller TC. FIG. 10(b) illustrates, as shown in the left side of FIG. 10(a), connection state of a switch circuit in which the odd-numbered sensors SE1, SE3, SE5, and SE7 function as detection electrodes, and the even-numbered sensor electrodes SE2, SE4, SE6, and SE8 function as drive electrodes. In that case, the odd-numbered sensor electrodes SE1, SE3, SE5, and SE7 are connected to the RxAFE wiring line to output detection signals, and the even-numbered sensor electrodes SE2, SE4, SE6, and SE8 are connected to the Tx wiring line to receive the input of drive signals.

Figure 11:
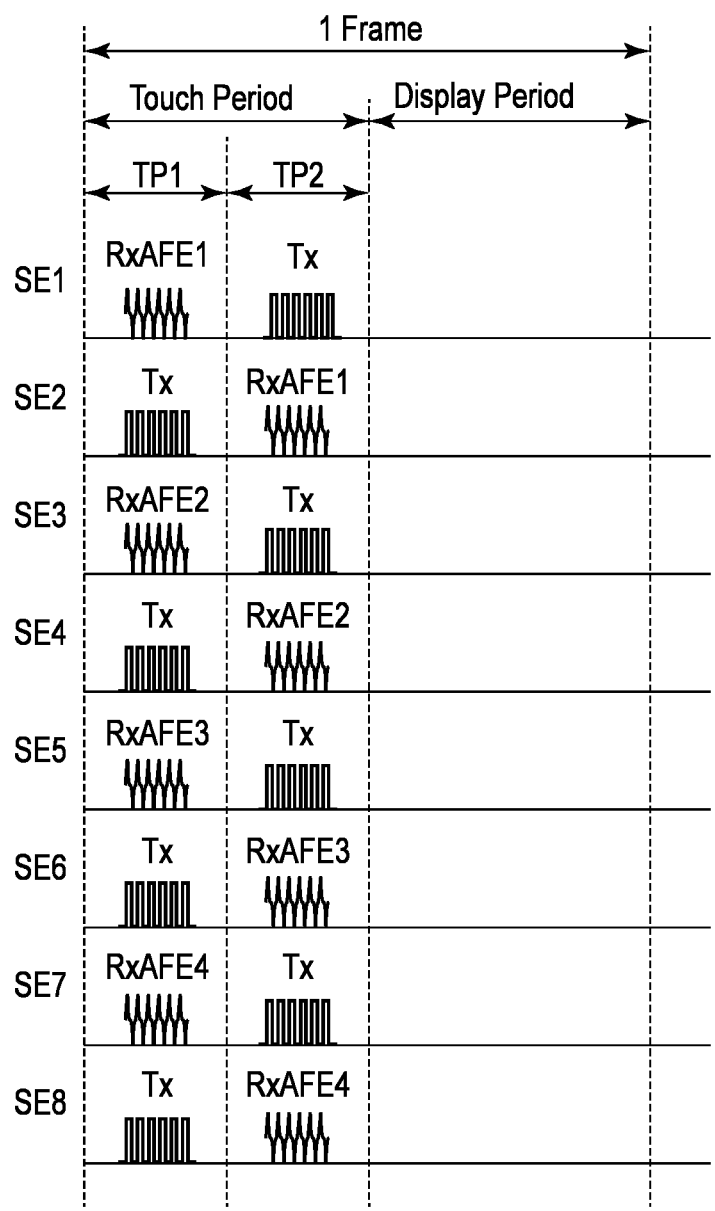
FIG. 11 is a timing chart illustrating drive timing of the sensor electrodes in the first drive method.

FIG. 11 is a timing chart illustrating the drive timing of sensor electrodes SE1 to SE8 using the first drive method.

Note that, in the present embodiment, one frame period includes a touch detection period TP to detect touching by sensor electrodes SE1 to SE8 placed in the non-display part NDA and a display period DP to display an image in the display part DA. Note that, in the present embodiment, a case where one frame period includes one touch detection period TP and one display period DP is considered; however, no limitation is intended thereby, and one frame period may include multiple touch detection periods TP and multiple display periods DP.

Figure 10:
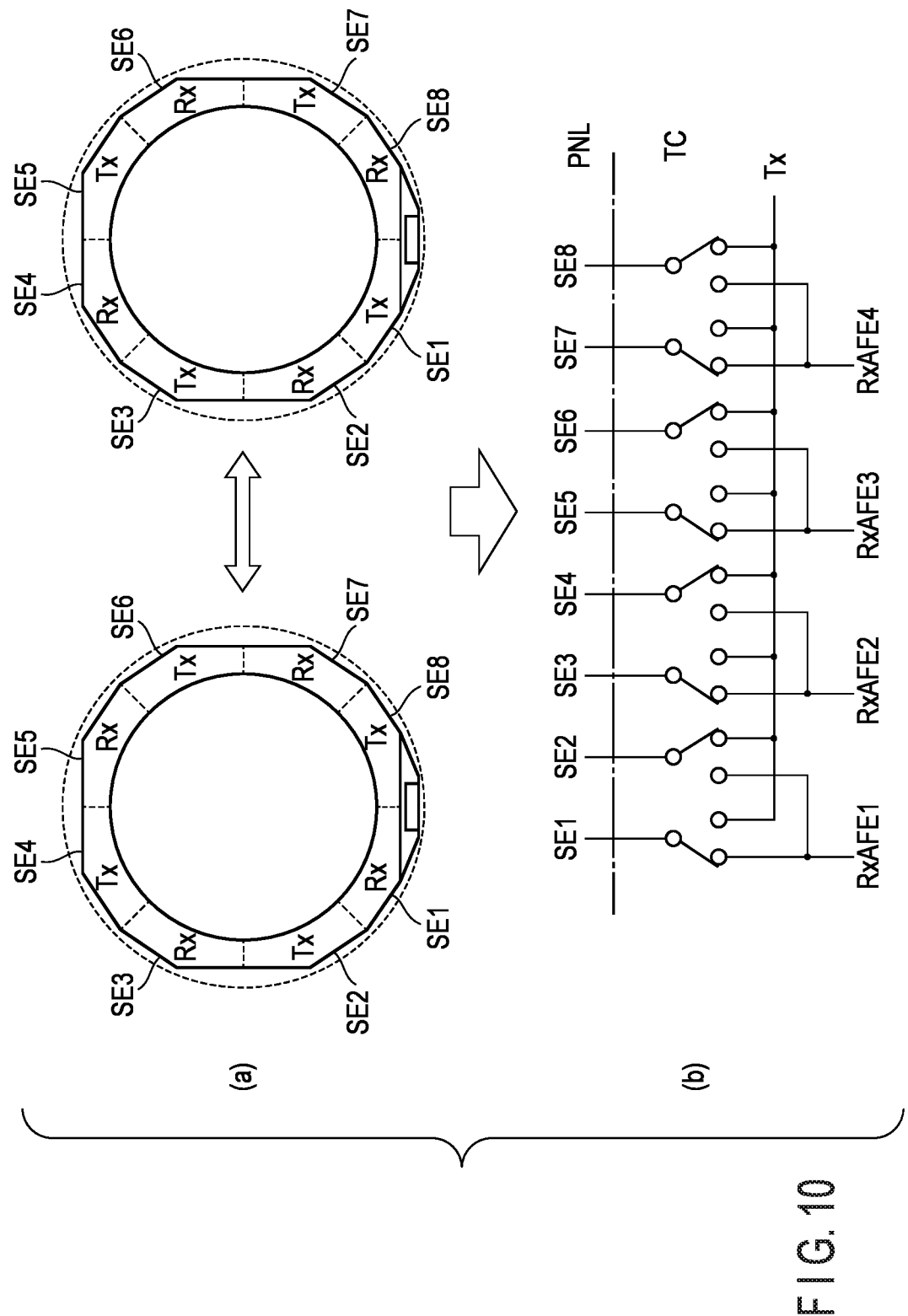
FIG. 10 is a diagram illustrating a first drive method which is one of drive methods for sensor electrodes.

The first drive method includes, as shown in FIG. 10 above, in the touch detection period TP, there are a period in which the odd-numbered sensor electrodes function as the detection electrodes and the even-numbered sensor electrodes function as the drive electrodes, and a period in which the even-numbered sensor electrodes function as the detection electrodes and the odd-numbered sensor electrodes function as the drive electrodes. Furthermore, FIG. 11 illustrates that the odd-numbered sensor electrodes and the even-numbered sensor electrodes alternate between functioning as detection electrodes and functioning as drive electrodes. Note that, in the following, the period included in the touch detection period TP, from the time when the switch circuit described above transitions to one connection state to the time when it transitions to another connection state, will be referred to as the touch frame.

For this reason, in a first touch frame TP1 included in the touch detection period TP of FIG. 11, the odd-numbered sensor electrodes SE1, SE3, SE5, and SE7 function as detection electrodes, and reads the detection signals RxAFE1 to RxAFE4, respectively, and the detection signals RxAFE1 to RxAFE4 are output to the touch controller TC. And, in the first touch frame TP1, the even-numbered sensor electrodes SE2, SE4, SE6, and SE8 function as drive electrodes, and the sensor electrodes SE2, SE4, SE6, and SE8 receive the input of the drive signals Tx from the touch controller TC.

Then, in a second touch frame TP2, which is a touch frame included in the touch detection period TP and follows the first touch frame TP, the odd-numbered sensor electrodes SE1, SE3, SE5, and SE7 function as drive electrodes, and the sensor electrodes SE1, SE3, SE5, and SE7 receive input of the drive signals Tx from the touch controller TC. And, in the second touch frame TP2, the even-numbered sensor electrodes SE2, SE4, SE6, and SE8 function as detection electrodes, and the sensor electrodes SE2, SE4, SE6, and SE8 read detection signals RxAFE1 to RxAFE4, respectively, and output the detection signals RxAFE1 to RxAFE4 to the touch controller TC.

When the first touch frame TP1 and the second touch frame TP2 are completed, the touch detection period TP ends, and the period transitions to the display period DP. When the display period DP ends, this one frame period ends, and the period transitions to the next one frame period.

If the waveforms of the detection signals RxAFE1 to RxAFE4 output from the sensor electrodes SE1 to SE8 in the touch detection period TP are different from the waveform in a case where an object does not approach or contact the sensor electrodes SE1 to SE8, the touch controller TC detects that an object is approaching or contacting the sensor electrodes outputting the detection signals with different waveform and two sensor electrodes adjacent to the aforementioned sensor electrode. Note that, the waveform in the case where an does not approach or contact the sensor electrodes SE1 to SE8 is, for example, preliminarily stored in a memory or the like, which is not shown.

In the first drive method, the sensor electrodes shall be driven such that the odd-numbered sensor electrodes SE1, SE3, SE5, and SE7 and the even-numbered sensor electrodes SE2, SE4, SE6, and SE8 are alternately switched, and thus, the touch detection period TP should include two touch frames, such as the first touch frame TP1 and the second touch frame TP2. According thereto, the number (types) of touch frames of the touch detection period TP can be low, and thus, there is no need for a switch circuit with a complicated configuration, or complicated control of the switch circuit, which means that the present embodiment is easily achieved.

Next, referring to FIGS. 12 and 13, a second drive method which is one of the methods of driving sensor electrodes SE1 to SE8 installed in the display device DSP will be explained. In the second drive method, sensor electrodes SE1 to SE8 detect an approaching or contacting object (that is, detect touching) using the mutual capacitive method.

In the second drive method, as in the left side of FIG. 12(a), in a certain touch frame, one sensor electrode among the sensor electrodes functions as a detection electrode to read detection signals, and two sensor electrodes adjacent to the sensor electrode that functions as the detection electrode function as drive electrodes to receive input of drive signals. The other sensor electrodes do not function as either detection electrodes or drive electrodes. Note that, in FIG. 12(a), the case where sensor electrodes functioning as detection electrodes are sequentially shifted in the clockwise direction for each touch frame is illustrated. However, no limitation is intended thereby, and the sensor electrode functioning as the detection electrode may shift sequentially in the counter-clockwise direction for each touch frame.

FIG. 12(b) illustrates an example of a switch circuit on/off of which is controlled by the touch controller TC to realize the second drive method. In FIG. 12(b), as in the left side of FIG. 12(a), the connection state of the switch circuit in a case where the sensor electrode SE2 functions as the detection electrode, and the two sensor electrodes SE1 and SE3 adjacent to the aforementioned sensor electrode SE2 function as drive electrodes is illustrated. In this case, the sensor electrode SE2 is connected to the RxAFE wiring line to output the detection signal, and sensor electrodes SE1 and SE3 are connected to the Tx wiring line to receive input of drive signals, while the other sensor electrodes SE4 to SE8 are connected to a DC wiring line to which a DC voltage is applied to prevent them from functioning as either detection electrode or drive electrode.

Note that, the other sensor electrodes SE4 to SE8 are not connected to any of the wiring lines, and may be floating. In this case, a DC wiring line can be omitted, which simplifies the circuit configuration and reduces the circuit size. Alternatively, the other sensor electrodes SE4 to SE8 may be connected to the Tx wiring line. In this case, although the power consumption increases slightly compared to the case where they are connected to the DC wiring line or are floating, it is possible to have, for example, a function to reduce parasitic capacitance and the influence of noise by using the drive signal Tx input to sensor electrodes SE4 to SE8 as a so-called guard signal.

Figure 13:
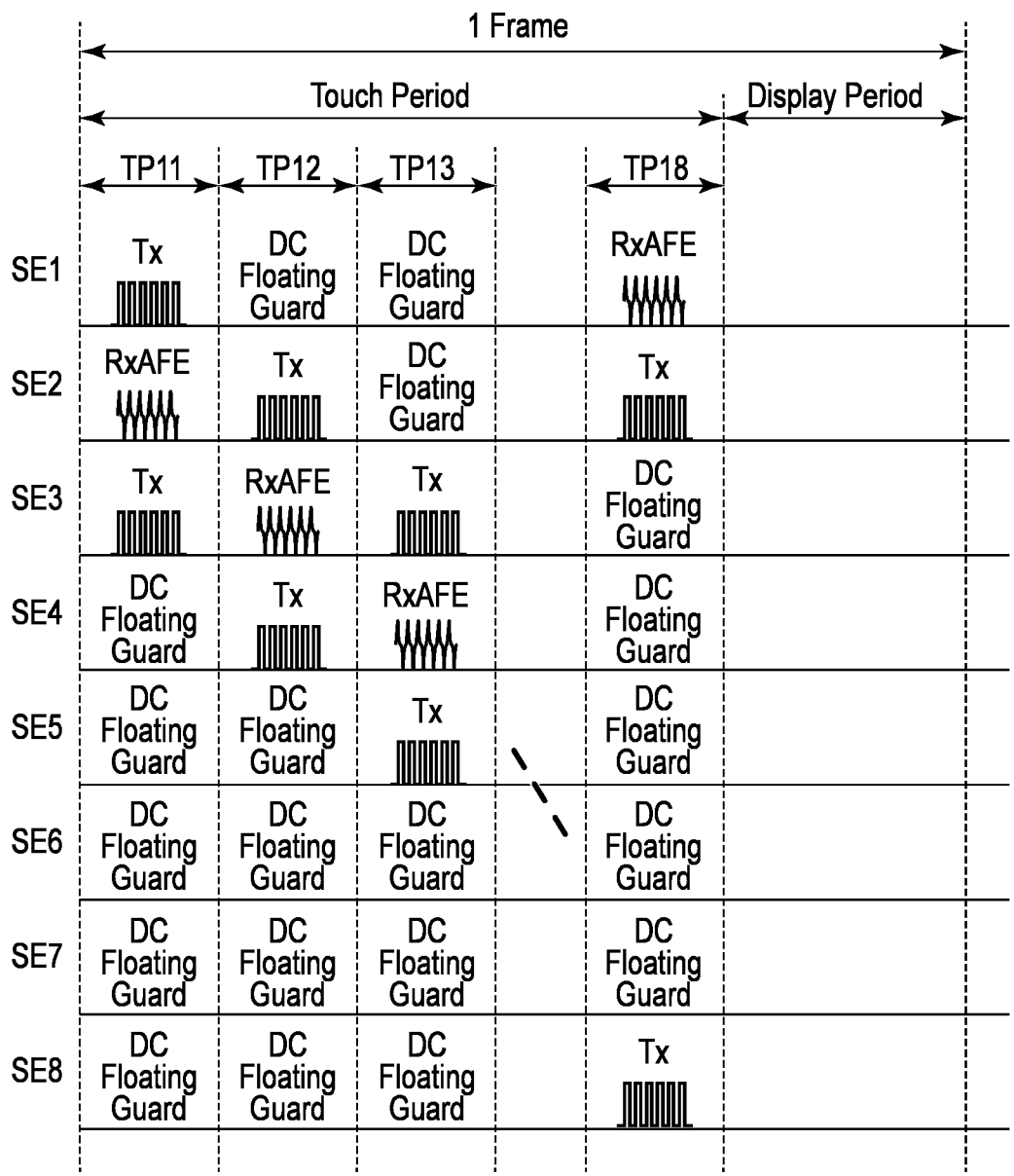
FIG. 13 is a timing chart illustrating drive timing of the sensor electrodes in the second drive method.

FIG. 13 is a timing chart illustrating the drive timing of sensor electrodes SE1 to SE8 using the second drive method.

The second drive method is characterized, as in FIG. 12 above, such that in one touch frame included in the touch detection period TP, one sensor electrode functions as a detection electrode, and two sensor electrodes adjacent to the detection electrode function as drive electrodes, wherein the detection electrode is shifted sequentially in each touch frame.

Therefore, in the first touch frame TP11 included in the touch detection period TP of FIG. 13, the sensor electrode SE2 functions as the detection electrode, and the sensor electrode SE2 reads the detection signal RxAFE to be output to the touch controller TC. And, in the first touch frame TP11, two sensor electrodes SE1 and SE3 adjacent to the sensor electrode SE2 function as drive electrodes, and these sensor electrodes SE1 and SE3 receive the input of the drive signal Tx from the touch controller TC. Note that, the other sensor electrodes SE4 to SE8 are connected to the DC wiring line, or are floating, or receiving the input of the drive signal Tx that functions as a guard signal, and thus, they do not function as either a detection electrode or a drive electrode.

The second touch frame TP12 is a touch frame included in the touch detection period TP and follows the first touch frame TP11 described above. In the second touch frame TP12, the sensor electrode SE3 functions as the detection electrode, and reads the detection signal RxAFE to be output to the touch controller TC. The sensor electrode SE3 adjacent clockwise to the sensor electrode SE2 which has functioned as the detection electrode in the first touch frame TP11. And, in the second touch frame TP12, the two sensor electrodes SE2 and SE4 adjacent to the sensor electrode SE3 function as the drive electrodes, and the two sensor electrodes SE2 and SE4 receive the input of the drive signal Tx from the touch controller TC. Note that, the other sensor electrodes SE1, and SE5 to SE8 are connected to the DC wiring line, or floating, or receiving the input of the drive signal Tx that functions as a guard signal, and thus, they do not function either as detection electrodes or as drive electrodes.

The third touch frame TP13 following the second touch frame TP12 and the frames thereafter function the same, and when all sensor electrodes SE1 to SE2 placed in the non-display part NDA function as detection electrodes once each in the eighth touch frame TP18, the touch detection period TP ends, transitioning to the display period DP. When the display period DP ends, this one frame period ends, transitioning to the next one frame period begins.

In this second drive method, one sensor electrode that functions as a detection electrode and two sensor electrodes that are adjacent to the sensor electrode and function as drive electrodes are driven in sets so that they are shifted sequentially. Since sensor electrodes other than this set do not function as detection electrodes or drive electrodes, it is possible to accurately identify the sensor electrode which an object has approached or contacted to. That is, it is possible to realize highly sensitive touch detection. Furthermore, in the second drive method, since only one sensor electrode functions as a detection electrode in one touch frame, the touch controller TC only needs to pay attention to the detection signal read from one sensor electrode in one touch frame, and therefore, the processing load on the touch controller TC can be reduced.

Figure 14:
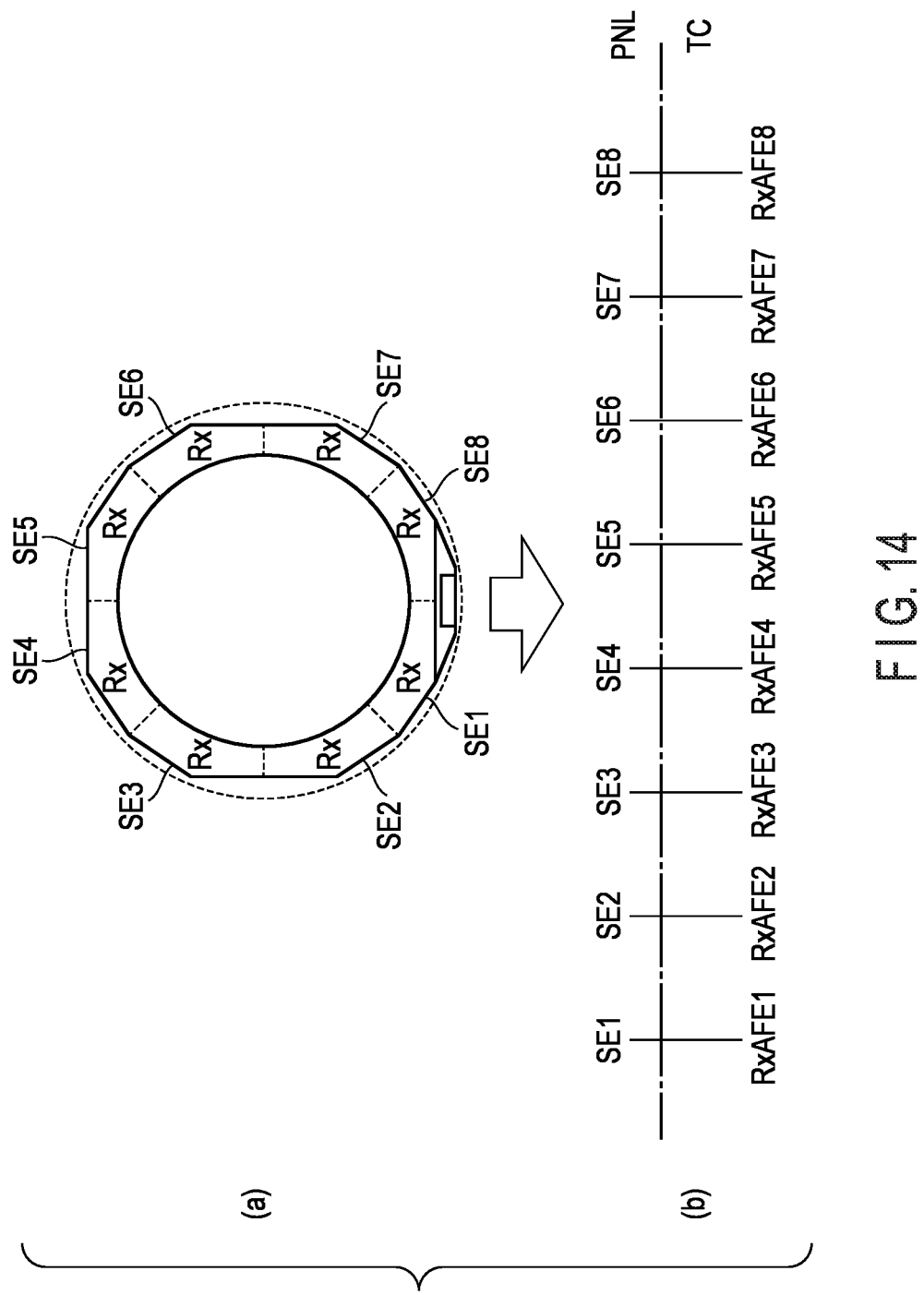
FIG. 14 is a diagram illustrating a third drive method which is one of the drive methods for sensor electrodes.
Figure 15:
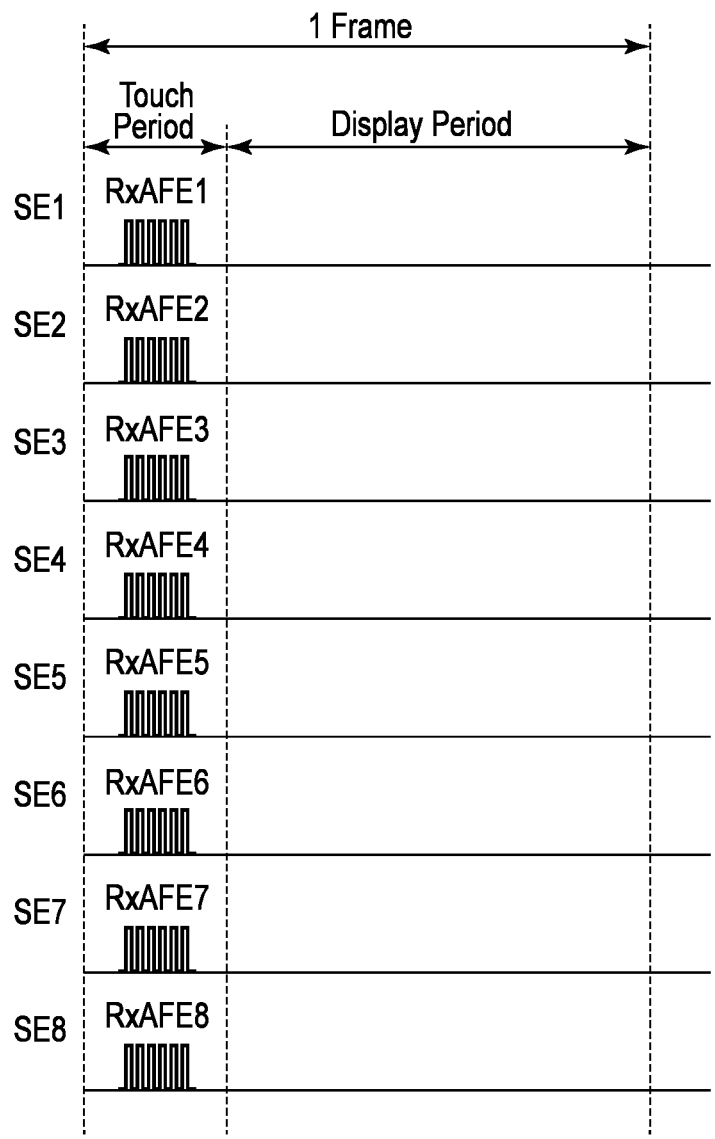
FIG. 15 is a timing chart illustrating drive timing of the sensor electrodes in the third drive method.

Now, referring to FIGS. 14 and 15, a third drive method which is one of the methods of driving sensor electrodes SE1 to SE8 of the display device DSP. Note that, in the third drive method, the sensor electrode SE1 to SE8 detect an approaching or contacting object (that is, detect touching) using the self-capacitance method.

In the third drive method, as described above, sensor electrodes SE1 to SE8 detect an approaching or contacting object using the self-capacitance method, and thus, as in FIG. 14(a), each of the sensor electrodes SE1 to SE8 functions as a detection electrode (Rx electrode) that receives the input of the drive signal and reads the detection signal.

FIG. 14(b) illustrates an example of a circuit configured to realize the third drive method. In this case, sensor electrodes SE1 to SE8 each function as the detection electrode, and thus, each sensor electrode SE1 to SE8 is connected to the RxAFE wiring line.

FIG. 15 is a timing chart illustrating the drive timing of sensor electrodes SE1 to SE8 using the third drive method.

The third drive method is characterized, as in FIG. 14 above, such that each sensor electrode functions as a detection electrode in the touch detection period TP. Therefore, in the touch detection period TP in FIG. 15, each of the sensor electrodes SE1 to SE8 functions as the detection electrode, and the sensor electrodes SE1 to SE8 read the detection signals RxAFE1 to RxAFE8, respectively, and output the detection signals RxAFE1 to RxAFE8 to the touch controller TC.

When the touch detection period TP ends, the transition is made to the display period DP, and when the display period DP ends, this frame period ends, and the transition to the next frame period is made.

In this third drive method, it is only necessary to drive the sensor electrode so that each sensor electrode SE1 to SE8 functions as a detection electrode, and thus, there is no need to configure the touch detection period TP with multiple touch frames, and the display period DP can be made longer. Furthermore, the third drive method does not require a switch circuit as in the first and second drive methods described above, and has the advantage of being easy to implement.

Figure 16:
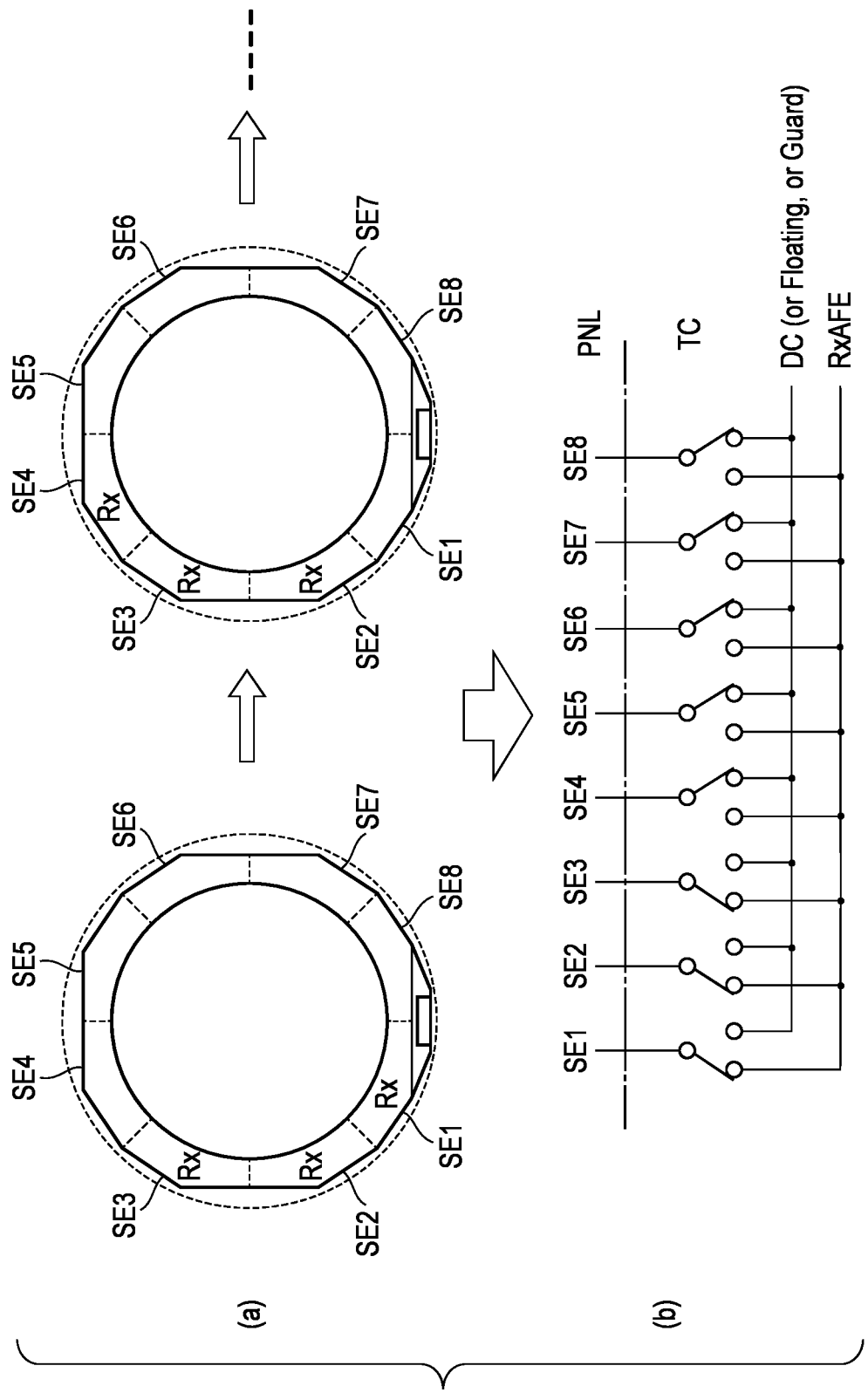
FIG. 16 is a diagram illustrating a fourth drive method which is one of the drive methods for sensor electrodes.
Figure 17:
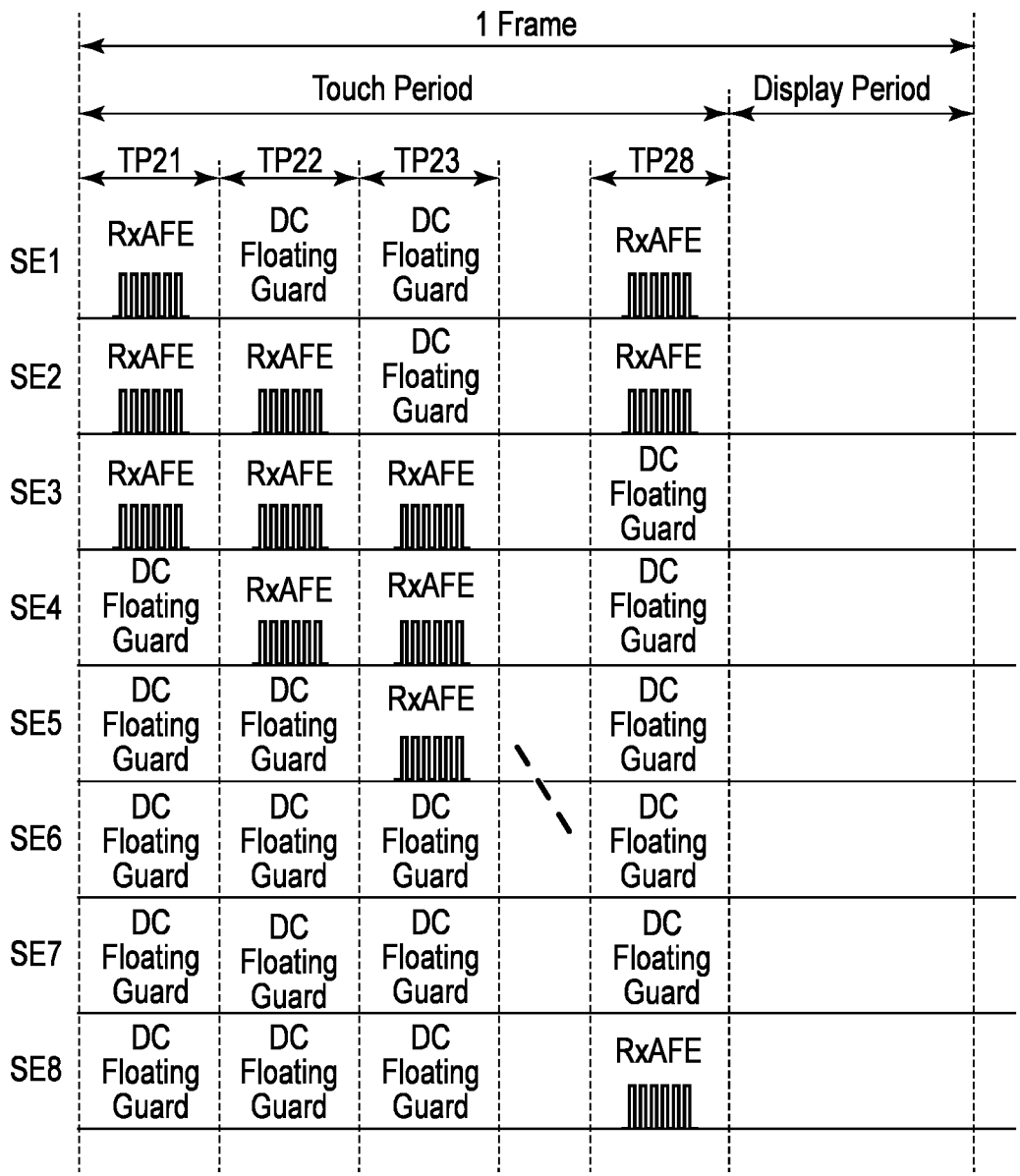
FIG. 17 is a timing chart illustrating drive timing of the sensor electrodes in the fourth drive method.

Next, referring to FIGS. 16 and 17, a fourth drive method which is one of the methods to drive sensor electrodes SE1 to SE8 of the display device DSP. Note that, in the fourth drive method, the sensor electrodes SE1 to SE8 detect an approaching or contacting object (that is, detect touching) using the self-capacitance method.

In the fourth drive method, as shown in the left side of FIG. 16(a), M sensor electrodes (3 in the case of FIG. 16) of multiple sensor electrodes are selected in a certain touch frame, wherein the M sensor electrodes function as detection electrodes to read detection signals, and the other sensor electrodes do not function detection electrodes. Note that, in FIG. 16(a), a case where M sensor electrodes functioning as detection electrodes are newly selected shifting in the clockwise direction for each touch frame by N (one in FIG. 16) is illustrated as an example; however, no limitation is intended thereby, and M sensor electrodes functioning as detection electrodes may be selected by shifting N electrodes in the counterclockwise direction for each touch frame. Note that, M and N are both positive integers, and N may be equal to M or different from M.

FIG. 16(b) illustrates an example of a switch circuit on/off of which is controlled by the touch controller TC to realize the fourth drive method. In FIG. 16(b), as in the left side of FIG. 16(a), a connection state of the switch circuit in which three sensor electrodes SE1 to SE3 function as detection electrodes is illustrated. In this case, sensor electrodes SE1 to SE3 are connected to the RxAFE wiring line to output detection signals, and the other sensor electrodes SE4 to SE8 are connected to the DC wiring line to prevent them from functioning as detection electrodes.

Note that the other sensor electrodes SE4 to SE8 are not connected to any of the wiring lines, and may be floating. In this case, it is possible to omit DC wiring lines, which simplifies the circuit configuration and reduces the circuit size. Alternatively, the other sensor electrodes SE4 to SE8 may be connected to the guard wiring line. In this case, although the power consumption increases slightly compared to the case where they are connected to the DC wiring line or floating, so-called guard signals can be input to the sensor electrodes SE4 to SE8.

FIG. 16 illustrates a bundled drive in which M consecutive sensor electrodes function as detection electrodes. However, the M sensor electrodes that function as detection electrodes may not necessarily be consecutive. Furthermore, M and N may both be set to one, one sensor electrode may sequentially function as a detection electrode for each touch frame. In this case, the switch circuit on/off of which is controlled by the touch controller TC should include at least one switch that is connected to each sensor wiring line extending from each sensor electrode. This makes it possible to simplify the circuit configuration and reduce the circuit size, and to minimize the processing load on the touch controller TC, for example.

FIG. 17 is a timing chart illustrating the drive timing of the sensor electrodes SE1 to SE8 using the fourth drive method.

The fourth drive method is characterized, as in FIG. 16 above, such that M sensor electrodes are selected in one touch frame included in the touch detection period TP, and the M sensor electrodes functioning as detection electrodes are shifted by N for each touch frame. Note that, in FIG. 17, M is set to 3 and N is set to 1 in the clockwise direction.

Therefore, in the first touch frame TP21 included in the touch detection period TP of FIG. 17, three sensor electrodes SE1 to SE3 function as detection electrodes, and the sensor electrodes SE1 to SE3 read the detection signals RxAFE to be output to the touch controller TC. Note that the other sensor electrodes SE4 to SE8 are either connected to the DC wiring line, or floating, or receiving the input of the guard signal, and do not function as detection electrodes.

Then, in the second touch frame TP22 included in the touch detection period TP, which follows the first touch frame TP21, the three sensors the three sensor electrodes SE2 to SE4 which are shifted by one electrode in the clockwise direction from the three sensor electrodes SE1 to SE3 which have functioned as detection electrodes in the first touch frame TP21 function as detection electrodes, and the sensor electrodes SE2 to SE4 read the detection signal RxAFE to be output to the touch controller TC. Note that, the other sensor electrodes SE1, and SE5 to SE8 are connected to the DC wiring line, or floating, or receiving the input of the guard signal, and do not function as detection electrodes.

The third touch frame TP23 following the second touch frame TP22 and the frames thereafter are operated in the same manner, and all sensor electrodes SE1 to SE2 that are placed in the non-display part NDA function as the detection electrode for the same number of times (three times in this example) in the eighth touch frame TP28, the touch detection period TP ends, transitioning to the display period DP. When the display period DP ends, this one frame period ends, and the transition to the next frame period is made.

In this fourth drive method, M sensor electrodes functioning as detection electrodes are selected, and the M sensor electrodes are driven in bundles (bundled driving), and M sensor electrodes functioning as the detection electrodes are selected shifting by N for each touch frame. Therefore, it is possible to receive the input of detection signals RxAFE while maintaining the predetermined resolution, and it is possible to accurately identify the sensor electrode with which an object is approaching or contacting. That is, it is possible to realize highly sensitive touch detection.

Figure 18:
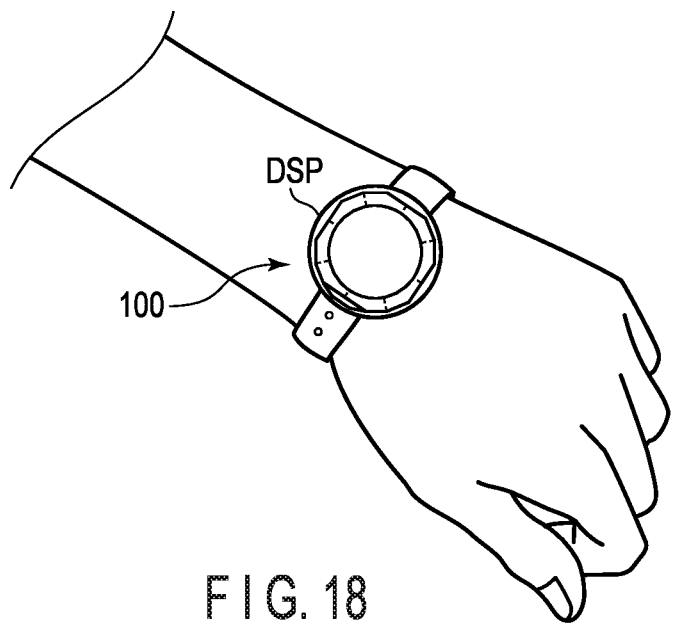
FIG. 18 is a diagram illustrating an application example of the display device of the embodiment.

FIG. 18 shows an example of application of the display device DSP of the embodiment. As in FIG. 18, the display device DSP is applied to, for example, a wristwatch 100. In this case, time and other information are displayed in the display part DA of the display device DSP, and the display device DSP responds to a predetermined gesture when sensor electrodes located in the non-display part NDA are touched (for example, a gesture of touching the circumferential part of the watch so as to rotate it clockwise by one rotation, a gesture of touching the circumferential part of the watch so as to rotate it counterclockwise by one rotation, a gesture of tapping), and therefore, it is possible to realize the operation according to the detected predetermined gesture.

Figure 19:
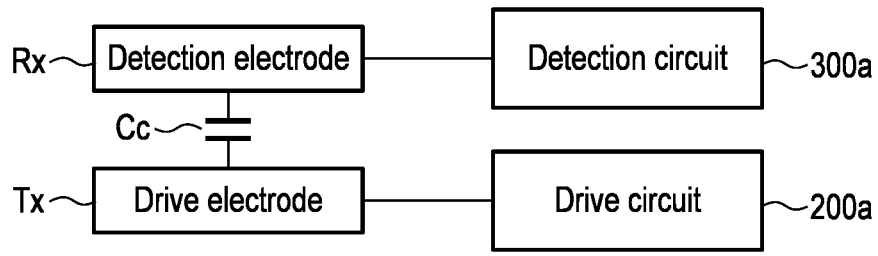
FIG. 19 is a diagram illustrating an example of principle of mutual-capacitive touch detection.
Figure 20:
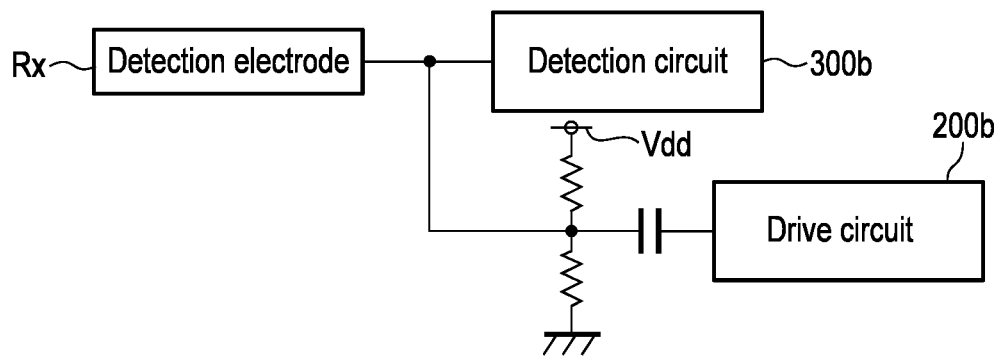
FIG. 20 is a diagram illustrating an example of principle of self-capacitive touch detection.

Referring to FIGS. 19 and 20, the principle of capacitive touch detection used in the embodiment will be explained.

FIG. 19 illustrates an example of the principle of touch detection by the mutual capacitive method. A capacitance Cc exists between the drive electrode Tx and the detection electrode Rx, which are facing each other. When a drive signal is supplied to the drive electrode Tx from the drive circuit 200*a*, the current flows to the detection electrode Rx through the capacitance Cc, and a detection signal of a predetermined waveform is read from the detection electrode Rx. On the other hand, when an object (a conductor such as a finger) approaches or contacts therewith, a capacitance is generated between the object and detection electrode Rx. In this state, the waveform of the detection signal read from the detection electrode Rx when the drive signal is supplied to the drive electrode Tx changes because of the capacitance generated between the object and the detection electrode Rx. The detection circuit 300*a* detects an approaching or contacting object based on the change in the waveform of the detection signal.

FIG. 20 illustrates an example of the principle of touch detection by the self-capacitance method. The voltage divided by the voltage of the power supply Vdd by the resistor division is supplied to the detection electrode Rx as the bias voltage. A drive signal with a predetermined waveform is supplied from the drive circuit 200*b* to the detection electrode Rx by capacitive coupling, etc., and the detection signal of a predetermined waveform is read from the detection electrode Rx. At this time, the amplitude of the detection electrode changes when the capacitance caused by a finger or the like is loaded on the detection electrode Rx. In FIG. 20, the amplitude of detection electrode Rx decreases. Therefore, in the equivalent circuit illustrated in FIG. 20, the detection circuit 300*b* detects the amplitude of the detection electrode Rx. Therefore, in the equivalent circuit illustrated in FIG. 20, the detection circuit 300*b* detects the amplitude of detection electrode Rx to detect the presence or absence of an approaching or contacting external proximity object such as a finger. Note that the self-detection circuit is not limited to the circuit illustrated in FIG. 20, and any circuit method may be adopted as long as the presence or absence of an external proximate object such as a finger can be detected using only the detection electrodes.

According to an embodiment described above, it is possible to suitably drive sensor electrodes SE1 to SE8 located in the non-display part NDA by various drive methods, and it is possible to provide a display device and a watch that have both display quality when displaying images and excellent operability by touch.

A skilled person would conceive various changes and modifications of the present invention within the scope of the technical concept of the invention, and naturally, such changes and modifications are encompassed by the scope of the present invention. For example, if a skilled person adds/deletes/alters a structural element or design to/from/in the above-described embodiments, or adds/deletes/alters a step or a condition to/from/in the above-described embodiment, as long as they fall within the scope and spirit of the present invention, such addition, deletion, and altercation are encompassed by the scope of the present invention.

Furthermore, regarding the present embodiments, any advantage and effect those will be obvious from the description of the specification or arbitrarily conceived by a skilled person are naturally considered achievable by the present invention.

What is claimed is:

1. A display device comprising:
   a display part configured to display an image;
   a plurality of sensor electrodes arranged to surround the display part; and
   a controller electrically connected to the sensor electrodes, and configured to detect an object close to or contacting the sensor electrodes, wherein
   the plurality of sensor electrodes are circularly arranged in series to surround the display part,
   width of each of the sensor electrodes is maximized in a center part,
   each of the sensor electrodes includes a connecting part to be electrically connected to the controller, in the center part,
   each of the connecting parts are located such that as the connecting part is located closer to the controller, the connecting part is closer to the display part, and
   the controller drives at least one of the sensor electrodes as a detection electrode and drives at least one of the sensor electrodes as a drive electrode.

2. The display device of claim 1, wherein, in a touch detection period in one frame period including a display period to display an image in the display part and the touch detection period to detect an object approaching or contacting the sensor electrodes, the controller drives one of the sensor electrodes as a detection electrode while driving two sensor electrodes adjacent to the detection electrode as drive electrodes.

3. The display device of claim 2, wherein the touch detection period includes a plurality of touch frames, and
   the controller drives, in a second touch frame following a first touch frame, a sensor electrode which has driven as the detection electrode in the first touch frame as the drive electrode, and drives a sensor electrode which has driven as the drive electrode in the first touch frame as the detection electrode.

4. The display device of claim 2, wherein the touch detection period includes a plurality of touch frames, and
   the controller drives, in a second touch frame following a first touch frame, a sensor electrode adjacent in a first direction to the sensor electrode which has driven as the detection electrode in the first touch frame as the detection electrode, and drives two sensor electrodes adjacent to the detection electrode in the first direction as drive electrodes, and prevents the other sensor electrodes from driving as detection electrodes or drive electrodes.

5. The display device of claim 4, wherein the controller applies a direct current voltage to the other sensor electrodes, or sets the other sensor electrodes to floating, or inputs a guard signal to the other sensor electrodes.

6. The display device of claim 1, wherein the display part includes a plurality of pixel electrodes and a common electrode opposed to the pixel electrodes, and
   the sensor electrodes are formed in the same layer as with the common electrode provided with the display part, and formed with the same conductive material as with the common electrode.

7. The display device of claim 6, further comprising:
   a first substrate including a scan line and a signal line crossing the scan line;
   a second substrate opposed to the first substrate; and a liquid crystal layer held between the first substrate and the second substrate, wherein the pixel electrodes are provided with the first substrate, and the common electrode is provided with the second substrate, and the sensor electrodes are provided with the second substrate as with the common electrode, are conductive with the first substrate via a conductive material included in a sealant to hold the liquid crystal layer, and are electrically connected to the controller via a wiring line provided with the first substrate.

8. The display device of claim 6, further comprising:
a first substrate including a scan line and a signal line crossing the scan line;
a second substrate opposed to the first substrate; and
a liquid crystal layer held between the first substrate and the second substrate, wherein
the pixel electrodes and the common electrode are both provided with the first substrate, and
the sensor electrodes are provided with the first substrate as with the common electrode, and are electrically connected to the controller via a wiring line provided with the first substrate.

9. The display device of claim 6, further comprising:
a first substrate including a scan line and a signal line crossing the scan line;
a second substrate opposed to the first substrate; and
a liquid crystal layer held between the first substrate and the second substrate, wherein
the sensor electrodes overlap, in a plan view, with a scan line drive circuit configured to output a scan signal to the scan line to display an image in the display part.

10. The display device of claim 1, further comprising:
a first substrate including a scan line and a signal line crossing the scan line;
a second substrate opposed to the first substrate; and
a liquid crystal layer held between the first substrate and the second substrate, wherein
the sensor electrodes are disposed on the second substrate.

11. A watch comprising the display device of claim 1.

12. A display device comprising:
a display part configured to display an image;
a plurality of sensor electrodes arranged to surround the display part; and
a controller electrically connected to the sensor electrodes and configured to detect an object approaching or contacting the sensor electrodes, wherein
the plurality of sensor electrodes are circularly arranged in series to surround the display part,
width of each of the sensor electrodes is maximized in a center part,
each of the sensor electrodes includes a connecting part to be electrically connected to the controller, in the center part,
each of the connecting parts are located such that as the connecting part is located closer to the controller, the connecting part is closer to the display part, and
the controller selects M sensor electrodes from the sensor electrodes, outputs a drive signal to detect an approaching or contacting object to the selected M sensor electrodes, and receives a detection signal output in response to the input of the drive signal from the selected M sensor electrodes.

13. The display device of claim 12, wherein the controller selects the M sensor electrodes in a touch detection period in one frame period including a display period to display an image in the display part and the touch detection period to detect an object approaching or contacting the sensor electrodes.

14. The display device of claim 13, wherein the touch detection period includes a plurality of touch frames, and
the controller newly selects, in a second touch frame following a first touch frame, M sensor electrodes including at least one different sensor electrode from M sensor electrodes selected in the first touch frame.

15. The display device of claim 12, wherein the display part includes a plurality of pixel electrodes and a common electrode opposed to the pixel electrodes, and
the sensor electrodes are formed in the same layer as with the common electrode provided with the display part, and formed with the same conductive material as with the common electrode.

16. The display device of claim 15, further comprising:
a first substrate including a scan line and a signal line crossing the scan line;
a second substrate opposed to the first substrate; and
a liquid crystal layer held between the first substrate and the second substrate, wherein
the pixel electrodes are provided with the first substrate, and
the common electrode is provided with the second substrate, and
the sensor electrodes are provided with the second substrate as with the common electrode, are conductive with the first substrate via a conductive material included in a sealant to hold the liquid crystal layer, and are electrically connected to the controller via a wiring line provided with the first substrate.

17. The display device of claim 15, further comprising:
a first substrate including a scan line and a signal line crossing the scan line;
a second substrate opposed to the first substrate; and
a liquid crystal layer held between the first substrate and the second substrate, wherein
the pixel electrodes and the common electrode are both provided with the first substrate, and
the sensor electrodes are provided with the first substrate as with the common electrode, and are electrically connected to the controller via a wiring line provided with the first substrate.

18. The display device of claim 15, further comprising:
a first substrate including a scan line and a signal line crossing the scan line;
a second substrate opposed to the first substrate; and
a liquid crystal layer held between the first substrate and the second substrate, wherein
the sensor electrodes overlap, in a plan view, with a scan line drive circuit configured to output a scan signal to the scan line to display an image in the display part.

19. The display device of claim 12, further comprising:
a first substrate including a scan line and a signal line crossing the scan line;
a second substrate opposed to the first substrate; and
a liquid crystal layer held between the first substrate and the second substrate, wherein
the sensor electrodes are disposed on the second substrate.

* * * * *